US010645365B2

(12) United States Patent
Nobori et al.

(10) Patent No.: US 10,645,365 B2
(45) Date of Patent: May 5, 2020

(54) CAMERA PARAMETER SET CALCULATION APPARATUS, CAMERA PARAMETER SET CALCULATION METHOD, AND RECORDING MEDIUM

(71) Applicant: Panasonic Intellectual Property Management Co., Ltd., Osaka (JP)

(72) Inventors: Kunio Nobori, Osaka (JP); Nobuhiko Wakai, Osaka (JP); Satoshi Sato, Kyoto (JP); Takeo Azuma, Kyoto (JP); Mikiya Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 71 days.

(21) Appl. No.: 15/961,041

(22) Filed: Apr. 24, 2018

(65) Prior Publication Data
US 2018/0316906 A1    Nov. 1, 2018

(30) Foreign Application Priority Data
May 1, 2017    (JP) .................................. 2017-091207

(51) Int. Cl.
*H04N 13/00*    (2018.01)
*H04N 13/246*    (2018.01)
(Continued)

(52) U.S. Cl.
CPC ............. *H04N 13/246* (2018.05); *G06T 7/85* (2017.01); *H04N 13/239* (2018.05);
(Continued)

(58) Field of Classification Search
CPC ............ G06K 2209/40; G06K 9/00791; G06T 2207/10012; G06T 2207/10024;
(Continued)

(56) References Cited

U.S. PATENT DOCUMENTS 7,307,655 B1    12/2007    Okamoto et al.
2006/0146142 A1*    7/2006    Arisawa ................. G01C 11/06
348/211.11
(Continued)

FOREIGN PATENT DOCUMENTS

JP    2003-528304    9/2003
JP    2012-202694    10/2012
(Continued)

OTHER PUBLICATIONS

Roger Y. Tsai, "A Versatile Camera Calibration Technique for High-Accuracy 3D Machine Vision Metrology Using off-the-Shelf TV Cameras and Lenses", IEEE Journal of Robotics and Automation, vol. RA-3, No. 4, Aug. 4, 1987, pp. 323-344.
(Continued)

*Primary Examiner* — Gims S Phillippe
(74) *Attorney, Agent, or Firm* — Wenderoth, Lind & Ponack, L.L.P.

(57) ABSTRACT

A camera parameter set calculation apparatus calculates three-dimensional coordinate sets corresponding to overlapping regions including images of a portion of a subject, based on a first and second images captured by a first and second cameras, a first camera parameter set of the first camera and a second camera parameter set of the second camera; determines first pixel coordinate pairs based on the first camera parameter set by projecting the three-dimensional coordinate sets on the first image; determines second pixel coordinate pairs based on the second camera parameter set by projecting the three-dimensional coordinate sets on the second image; calculates an evaluation value, based on pixel values at the first pixel coordinate pairs on the first image and pixel values at the second pixel coordinate pairs on the second image; and updates the first and second camera parameter sets based on the evaluation value.

21 Claims, 16 Drawing Sheets

(51) Int. Cl.
*G06T 7/80* (2017.01)
*H04N 13/275* (2018.01)
*H04N 13/239* (2018.01)
*H04N 13/243* (2018.01)
*G06K 9/00* (2006.01)
*H04N 5/232* (2006.01)

(52) U.S. Cl.
CPC ......... *H04N 13/243* (2018.05); *H04N 13/275* (2018.05); *G06K 9/00791* (2013.01); *G06K 2209/40* (2013.01); *G06T 2207/10012* (2013.01); *G06T 2207/10024* (2013.01); *G06T 2207/30208* (2013.01); *G06T 2207/30264* (2013.01); *H04N 5/23238* (2013.01)

(58) Field of Classification Search
CPC . G06T 2207/30208; G06T 2207/30264; G06T 7/85; H04N 13/239; H04N 13/243; H04N 13/246; H04N 13/275; H04N 5/23238
USPC .......................................................... 348/47
See application file for complete search history.

(56) References Cited

U.S. PATENT DOCUMENTS

| | | | |
|---|---|---|---|
| 2015/0172633 A1 | 6/2015 | Nobori et al. | |
| 2016/0140713 A1* | 5/2016 | Martin | H04N 5/3572 382/154 |
| 2019/0122389 A1* | 4/2019 | Inaba | G06T 7/85 |

FOREIGN PATENT DOCUMENTS

| | | |
|---|---|---|
| JP | 2015-133691 | 7/2015 |
| JP | 2015-179432 | 10/2015 |
| WO | 2000/007373 | 2/2000 |
| WO | 2001/071280 | 9/2001 |

OTHER PUBLICATIONS

C. Zach et al., "A duality based approach for realtime TV-L1 optical flow", In Proceedings of the 29th DAGM conference on Pattern recognition, 2007, pp. 214-223.

Takashi Matsuyama et al., "Computer Vision", New Technology Communications, Jun. 15, 1998, pp. 123-137 (Partial Translation).

* cited by examiner

CAMERA PARAMETER SET CALCULATION APPARATUS, CAMERA PARAMETER SET CALCULATION METHOD, AND RECORDING MEDIUM

BACKGROUND

1. Technical Field

The present disclosure relates to a camera parameter set calculation apparatus, a camera parameter set calculation method, and a recording medium.

2. Description of the Related Art

Numerous techniques for use in safety driving support systems for automobiles, surveillance camera systems for detecting suspicious persons, or the like have been proposed for generating a new image using images captured by cameras and presenting the generated image to a user. For example, an image generating apparatus disclosed in Japanese Patent No. 3286306 captures images of surroundings of a vehicle by using a total of four cameras mounted on the front, rear, and left and right sides of the vehicle. Further, the image generating apparatus maps the images captured by the four cameras to a predetermined spatial model to generate a top-down view of the 360-degree surroundings of the vehicle. This technique enables generation of an image from a viewpoint that appears to be located directly above the subject vehicle looking straight down and thus has an advantage that allows the driver to readily recognize the surroundings of the vehicle.

Generating an image from images captured by cameras requires a camera parameter set of each of the cameras. Calculation of a camera parameter set is referred to as camera calibration. Japanese Unexamined Patent Application Publication (Translation of PCT Application) No. 2003-528304 and Roger Y. Tsai, "A Versatile Camera Calibration Technique for High-Accuracy 3D Machine Vision Metrology Using Off-the-Shelf TV Cameras and Lenses", Journal of Robotics and Automation, IEEE, August 1987, Vol. RA-3, No. 4, p. 323-344 (hereinafter, Non-Patent Literature 1) provide the detailed description of camera calibration. For example, in a camera calibration technique disclosed in Non-Patent Literature 1, sets each including a three-dimensional coordinate set of a reference point for calibration and a pixel coordinate set (i.e., pixel coordinate pair) of an image of the reference point included in the image captured by a camera are prepared and input. Furthermore, distances (also referred to as reprojection errors) between points obtained by projecting the reference points at the respective three-dimensional coordinate sets on the image by using image camera parameters of the camera and the corresponding pixel coordinate pairs for the reference points are further calculated. Moreover, the camera parameter set that minimizes the total sum of the reprojection errors is calculated (also see, for example, J. Maybank and O. D. Faugeras, "A Theory of Self-calibration of a Moving Camera", International Journal of Computer Vision, 1992, 8(2):123-151).

SUMMARY

In the calibration techniques of the related art, reference points, sets each including a three-dimensional coordinate set of each of the reference points and a pixel coordinate pair for each of the reference points, are used as input. Thus, the calibration techniques of the related art require a calibration marker for obtaining the reference points. There is another issue in that the three-dimensional positions of the reference points may change due to factors such as changes over time, external force, or temperature changes. It is difficult to carry out accurate calibration without knowing the changed three-dimensional coordinate sets.

One non-limiting and exemplary embodiment provides a camera parameter set calculation apparatus, a camera parameter set calculation method, and a recording medium that enable self-calibration of cameras without requiring three-dimensional coordinate sets of reference points to be provided in advance.

In one general aspect, the techniques disclosed here feature a camera parameter set calculation apparatus including at least one control circuit. The at least one control circuit (a1) obtains a first image captured by a first camera and a second image captured by a second camera, (a2) obtains a first camera parameter set including one or more camera parameters of the first camera and a second camera parameter set including one or more camera parameters of the second camera, (a3) calculates three-dimensional coordinate sets corresponding to overlapping regions each included in the first image and the second image, based on the first image, the second image, the first camera parameter set, and the second camera parameter set, the overlapping region of the first image including an image of a portion of a subject, the overlapping region of the second image including an image of the portion, (a4) determines first pixel coordinate pairs based on the first camera parameter set by projecting the three-dimensional coordinate sets on the first image and second pixel coordinate pairs based on the second camera parameter set by projecting the three-dimensional coordinate sets on the second image, (a5) calculates an evaluation value, based on pixel values at the first pixel coordinate pairs on the first image and pixel values at the second pixel coordinate pairs on the second image, (a6) updates the first camera parameter set and the second camera parameter set, based on the evaluation value, and (a7) outputs the updated first camera parameter set and the updated second camera parameter set.

It should be noted that general or specific embodiments may be implemented as a system, a method, an integrated circuit, a computer program, a storage medium, or any selective combination thereof.

A camera parameter set calculation technique according to an aspect of the present disclosure enables self-calibration of cameras without requiring three-dimensional coordinate sets of reference points to be provided in advance.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
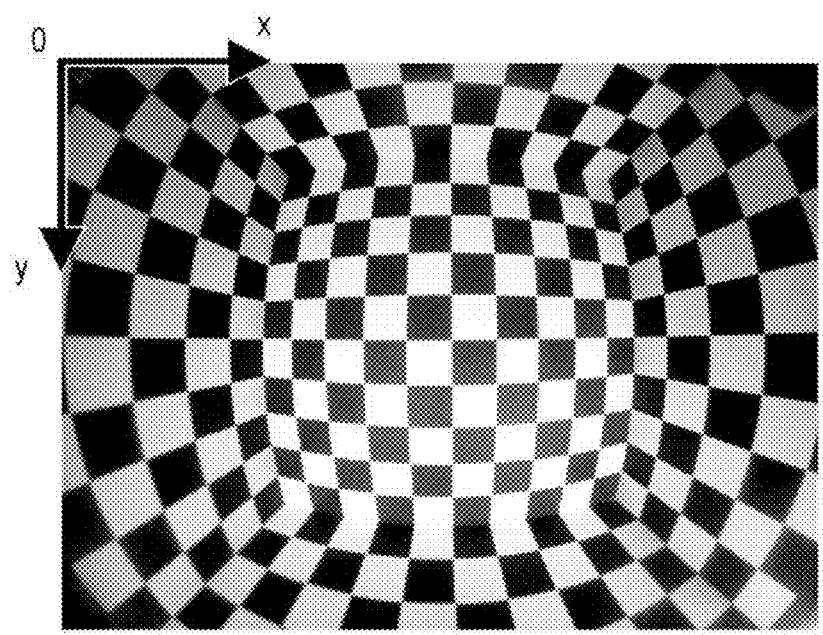
FIG. 1 is a schematic diagram illustrating an example calibration marker of the related art.

Underlying Knowledge Forming Basis of the Present Disclosure

The inventors have found the following issues with the camera calibration described in the "BACKGROUND" section. Specifically, numerous techniques for use in safety driving support systems for automobiles, surveillance camera systems for detecting suspicious persons, or the like have been proposed for making the surroundings of a vehicle or a monitored area easily visible to a user. Such techniques include techniques for generating an image from images captured by cameras, and techniques for superimposing an auxiliary line on an image captured by a camera such that the auxiliary line can be used as a reference for locating a position. When cameras are set at different positions, generating an image from images captured by the cameras requires a camera parameter set of each of the cameras, such as the position and orientation, focal distance, and the position of the center of the optical axis of each camera. A camera parameter set includes a camera model and parameters for the model that represent, when an image of a certain point on a subject is captured by a camera, a relationship between a three-dimensional coordinate set of the certain point and a two-dimensional coordinate set (i.e., two-dimensional coordinate pair) (also referred to as pixel coordinate pair) of the image of the point. Calculation of a camera parameter set is referred to as camera calibration. More specifically, a camera parameter set includes two camera parameter sets, namely, an extrinsic parameter set and an intrinsic parameter set. The extrinsic parameter set represents a positional relationship between a three-dimensional world coordinate system determined with reference to the imaging space of the camera and a three-dimensional camera coordinate system determined with reference to the camera. The intrinsic parameter set represents a relationship between a three-dimensional coordinate set of a subject in the camera coordinate system and the position of the subject over an image captured by the camera.

The term "coordinate pair", as used herein, refers to a single combination of a coordinate for one axis and a coordinate for another axis in a two-dimensional Cartesian coordinate system.

The term "coordinate set", as used herein, refers to a single combination of a coordinate for one axis, a coordinate for another axis, and a coordinate for still another axis in a three-dimensional Cartesian coordinate system.

Exemplary Calibration Techniques of Related Art

In the camera calibration technique disclosed in Non-Patent Literature 1, sets each including a three-dimensional coordinate set of a reference point and a pixel coordinate pair for the reference point are prepared and used as input elements. Further, a camera parameter set that minimizes the total sum of distances (reprojection errors) between points obtained by projecting the reference points at the respective three-dimensional coordinate sets on an image by using camera parameters and the corresponding pixel coordinate pairs for the reference points is calculated.

A calibration marker with a specific pattern is commonly used to obtain sets each including a three-dimensional coordinate set of a reference point and a pixel coordinate pair for the reference point. FIG. 1 illustrates an example of the calibration marker. In the example illustrated in FIG. 1, a pattern of lattices is provided on the inner side of a box-shaped subject such that the lattices are arranged at certain intervals. Each lattice point, that is, each corner of each lattice, is defined as a reference point, and a design value set for a three-dimensional coordinate set of a lattice point, which is a reference point, or a measured three-dimensional coordinate set of the reference point, which is obtained after the reference point is placed, is stored. Further, an image of the reference point is captured by a camera, and a pixel coordinate pair of an image of a lattice point, which is the reference point, is estimated through image processing to obtain information on a set including the three-dimensional coordinate set and the pixel coordinate pair for the reference point. Calibration techniques using such a calibration marker are effective in situations where the calibration marker is easily used, such as in calibration performed in factories after production of cameras. In addition, a high-accuracy calibration marker for three-dimensional coordinate sets is used or both image processing that enables high-accuracy estimation for pixel coordinate pairs and a calibration marker having a specific pattern are adopted, thereby achieving high-accuracy calibration. However, equipment or the like including a calibration marker is required. In particular, a larger calibration marker is required to cover the imaging range of a camera having a larger imaging range.

Camera calibration is also required, in addition to during production, when a camera parameter set is changed due to factors such as changes over time, deformation under external force, or temperature changes while a device including the camera is in operation. In safety driving support systems for automobiles, surveillance camera systems, and the like, it is desirable to use a calibration method that requires neither equipment or the like including a calibration marker nor manual operation. That is, it is desirable to use a calibration method based on self-calibration. Automatic update of a camera parameter set by a system including a camera is referred to as self-calibration.

Japanese Unexamined Patent Application Publication (Translation of PCT Application) No. 2003-528304 discloses a self-calibration technique for automatically calibrating a stereo camera installed in a vehicle by using a system. In the technique disclosed in this publication, a calibration marker having a specific pattern such as a pattern of lattices is not used but a stationary object in the field of view of a camera is stored as a calibration target. When the position of the calibration target changes within the field of view of the camera, the self-calibration of the camera is performed by using information on a three-dimensional coordinate set of the calibration target.

In the calibration technique of the related art, however, the three-dimensional coordinate set of the calibration target, which is obtained in advance, is assumed to remain unchanged. Thus, if the three-dimensional coordinate set of the calibration target changes due to factors such as changes over time, external force, or temperature changes, accurate calibration is not achievable. Accordingly, the inventors have developed the following technique for enabling camera calibration without requiring a calibration marker and three-dimensional coordinate sets of calibration reference points to be provided in advance.

A camera parameter set calculation apparatus according to an aspect of the present disclosure includes at least one control circuit. The at least one control circuit (a1) obtains a first image captured by a first camera and a second image captured by a second camera, (a2) obtains a first camera parameter set including one or more camera parameters of the first camera and a second camera parameter set including one or more camera parameters of the second camera, (a3) calculates three-dimensional coordinate sets corresponding to overlapping regions each included in the first image and the second image, based on the first image, the second image, the first camera parameter set, and the second camera parameter set, the overlapping region of the first image including an image of a portion of a subject, the overlapping region of the second image including an image of the portion, (a4) determines first pixel coordinate pairs based on the first camera parameter set by projecting the three-dimensional coordinate sets on the first image and second pixel coordinate pairs based on the second camera parameter set by projecting the three-dimensional coordinate sets on the second image, (a5) calculates an evaluation value, based on pixel values at the first pixel coordinate pairs on the first image and pixel values at the second pixel coordinate pairs on the second image, (a6) updates the first camera parameter set and the second camera parameter set, based on the evaluation value, and (a7) outputs the updated first camera parameter set and the updated second camera parameter set.

According to the aspect described above, camera parameter sets of the first camera and the second camera, which are configured such that images captured by the first camera and the second camera include partial overlapping regions, can be calculated based on an evaluation value. Therefore, if the first camera and the second camera are away from each other or are oriented in different directions, the camera parameter sets can be calculated. A first target portion and a second target portion corresponding to pixel coordinate pairs to be used for the calculation of an evaluation value are extracted from the first image and the second image, respectively. The first target portion and the second target portion are not preset references whose coordinate sets or the like is known. Thus, equipment including a calibration marker that includes known reference points is not required for the correspondences between three-dimensional coordinate sets and pixel coordinate pairs during the calculation of camera parameter sets. In other words, in this aspect, three-dimensional coordinate sets of reference points that are obtained in advance are not used, which enables accurate self-calibration of cameras independently of changes of the reference points due to factors such as changes over time, external force, or temperature changes.

When the first camera parameter set and the second camera parameter set are correct, a pixel value at a first pixel coordinate pair on the first image corresponding to the three-dimensional coordinate set of a given point and a pixel value at a second pixel coordinate pair on the second image corresponding to the three-dimensional coordinate set of the given point are equal. When the first camera parameter set or the second camera parameter set is farther away from the correct value, that is, the first camera parameter set or the second camera parameter set has a larger amount of error, a larger difference occurs between the pixel value at a pixel coordinate pair on the first image and the pixel value at a pixel coordinate pair, on the second image, estimated to correspond to be the pixel coordinate pair on the first image. Therefore, if the first camera parameter set or the second camera parameter set includes error, the first camera parameter set and the second camera parameter set are modified based on a difference between the pixel value on the first image and the pixel value on the second image in such a manner as to, for example, minimize the difference, thereby obtaining correct camera parameter sets. That is, the first and second cameras can be calibrated.

In the camera parameter set calculation apparatus according to the aspect of the present disclosure, the first image and the second image may be one of (i) a combination of images including an image obtained by a camera mounted on a front of a vehicle capturing an image of an area in front of the vehicle and an image obtained by a camera mounted on a left side of the vehicle capturing an image of an area on the left side of the vehicle, (ii) a combination of images including an image obtained by the camera mounted on the front of the vehicle capturing an image of an area in front of the vehicle and an image obtained by a camera mounted on a right side of the vehicle capturing an image of an area on the right side of the vehicle, (iii) a combination of images including an image obtained by a camera mounted on a rear of the vehicle capturing an image of an area behind the vehicle and an image obtained by the camera mounted on the left side of the vehicle capturing an image of an area on the left side of the vehicle, or (iv) a combination of images including an image obtained by the camera mounted on the rear of the vehicle capturing an image of an area behind the vehicle and an image obtained by the camera mounted on the right side of the vehicle capturing an image of an area on the right side of the vehicle.

In the aspect described above, the first camera and the second camera, which are oriented in different directions, are configured or arranged such that images captured by the first camera and the second camera include partial overlapping regions, thereby enabling calculation of the camera parameter sets.

In the camera parameter set calculation apparatus according to the aspect of the present disclosure, furthermore, in (a5), the at least one control circuit may calculate the evaluation value, based on differences between the pixel values at the first pixel coordinate pairs on the first image and the pixel values at the second pixel coordinate pairs on the second image.

According to the aspect described above, if there are differences between the pixel values at the first pixel coordinate pairs on the first image and the pixel values at the second pixel coordinate pairs on the second image, the first camera parameter set and the second camera parameter set can be determined to have an error from the true values. This facilitates the determination of whether the first camera parameter set and the second camera parameter set are good. In addition, the first camera parameter set and the second camera parameter set are modified, or updated, in such a manner as to, for example, reduce the differences, thereby enabling the first camera parameter set and the second camera parameter set to be configured appropriately.

In the camera parameter set calculation apparatus according to the aspect of the present disclosure, furthermore, the at least one control circuit may further obtain a third image captured by a third camera and a third camera parameter set of the third camera, determine sets of two images among the first image, the second image, and the third image, and sequentially perform (a3) to (a5) on the sets of two images.

According to the aspect described above, the use of multiple camera images presumably increases the area of the overlapping regions. Therefore, calibration accuracy is presumably increased. Since the calculation of an evaluation value is completed with the use of two images, the evaluation value can be calculated such that the evaluation value is not interfered with by other images. Accordingly, it can be determined whether results obtained from the two images are appropriate. For example, a method for modifying a camera parameter set can be examined in accordance with a determination result. That is, calibration for partial regions in the fields of view of the cameras can be performed.

In the camera parameter set calculation apparatus according to the aspect of the present disclosure, furthermore, the at least one control circuit may further obtain a third image captured by a third camera and a third camera parameter set of the third camera, determine sets of two images among the first image, the second image, and the third image, and perform (a3) to (a5) on the sets of two images to obtain pixel values and calculating the evaluation value by using the obtained pixel values.

According to the aspect described above, the use of multiple camera images presumably results in an increase in the area of the overlapping regions. Therefore, calibration accuracy is presumably increased. The pixel values calculated for the sets of two images are applied to the calculation of an evaluation value, which enables a single camera to be calibrated by using multiple overlapping regions. This enables an increase in the area of an image that can be used for calibration and enables entire calibration of a camera over a wide region in the field of view thereof. In addition, the pixel values calculated for the pairs of images are applied to the calculation of an evaluation value, which enables entire calibration of the first camera, the second camera, and the third camera.

In the camera parameter set calculation apparatus according to the aspect of the present disclosure, furthermore, the first image and the second image may each include a first overlapping region including a portion of the subject, the second image and the third image may each include a second overlapping region including a portion of the subject, and the first overlapping region and the second overlapping region may not overlap each other.

According to the aspect described above, three or more images do not overlap each other in each overlapping region. This can increase the area of the overlapping region. Therefore, the size of the region to be calibrated on an image can be increased, which enables calibration to be performed over a wide region on an image. Accordingly, calibration accuracy is improved.

In the camera parameter set calculation apparatus according to the aspect of the present disclosure, furthermore, the first image and the second image may be images captured by the first camera and the second camera, respectively, the first camera and the second camera being arranged such that an optical axis of the first camera and an optical axis of the second camera are directed to intersect at centers of the optical axes.

A camera parameter set calculation method according to another aspect of the present disclosure includes (a1) obtaining a first image captured by a first camera and a second image captured by a second camera, (a2) obtaining a first camera parameter set including one or more camera parameters of the first camera and a second camera parameter set including one or more camera parameters of the second camera, (a3) calculating three-dimensional coordinate sets corresponding to overlapping regions each included in the first image and in the second image, based on the first image, the second image, the first camera parameter set, and the second camera parameter set, the overlapping region of the first image including an image of a subject, the overlapping region of the second image including an image of the portion, (a4) determining first pixel coordinate pairs based on the first camera parameter set by projecting the three-dimensional coordinate sets on the first image and second pixel coordinate pairs based on the second camera parameter set by projecting the three-dimensional coordinate sets on the second image, (a5) calculating an evaluation value, based on pixel values at the first pixel coordinate pairs on the first image and pixel values at the second pixel coordinate pairs on the second image, (a6) updating the first camera parameter set and the second camera parameter set, based on the evaluation value, and (a7) outputting the updated first camera parameter set and the updated second camera parameter set. At least one of (a1) to (a8) is performed by a processor. According to the aspect described above, advantages similar to those of the camera parameter set calculation apparatus according to the aspect of the present disclosure can be achieved.

In the camera parameter set calculation method according to the aspect of the present disclosure, furthermore, the first image and the second image may be one of (i) a combination of images including an image obtained by a camera mounted on a front of a vehicle capturing an image of an area in front of the vehicle and an image obtained by a camera mounted on a left side of the vehicle capturing an image of an area on the left side of the vehicle, (ii) a combination of images including an image obtained by the camera mounted on the front of the vehicle capturing an image of an area in front of the vehicle and an image obtained by a camera mounted on a right side of the vehicle capturing an image of an area on the right side of the vehicle, (iii) a combination of images including an image obtained by a camera mounted on a rear of the vehicle capturing an image of an area behind the vehicle and an image obtained by the camera mounted on the left side of the vehicle capturing an image of an area on the left side of the vehicle, or (iv) a combination of images including an image obtained by the camera mounted on the rear of the vehicle capturing an image of an area behind the vehicle and an image obtained by the camera mounted on the right side of the vehicle capturing an image of an area on the right side of the vehicle.

In the camera parameter set calculation method according to the aspect of the present disclosure, furthermore, in (a5), the evaluation value may be calculated based on differences between the pixel values at the first pixel coordinate pairs on the first image and the pixel values at the second pixel coordinate pairs on the second image.

The camera parameter set calculation method according to the aspect of the present disclosure may further include further obtaining a third image captured by a third camera and a third camera parameter set of the third camera, determining sets of two images among the first image, the second image, and the third image, and sequentially performing (a3) to (a5) on the sets of two images.

Alternatively, the camera parameter set calculation method according to the aspect of the present disclosure may further include further obtaining a third image captured by a third camera and a third camera parameter set of the third camera, determining sets of two images among the first image, the second image, and the third image, and performing (a3) to (a5) on the sets of two images to obtain pixel values and calculating the evaluation value by using the obtained pixel values.

In the camera parameter set calculation method according to the aspect of the present disclosure, furthermore, the first image and the second image may each include a first overlapping region including a portion of the subject, the second image and the third image may each include a second overlapping region including a portion of the subject, and the first overlapping region and the second overlapping region may not overlap each other.

In the camera parameter set calculation method according to the aspect of the present disclosure, furthermore, the first image and the second image may be images captured by the first camera and the second camera, respectively, the first camera and the second camera being arranged such that an optical axis of the first camera and an optical axis of the second camera are directed to intersect at centers of the optical axes.

A recording medium according to an aspect of the present disclosure is a recording medium storing a program for causing a device including a processor to execute a process, the recording medium being a computer-readable non-volatile recording medium. The process includes (a1) obtaining a first image captured by a first camera and a second image captured by a second camera, (a2) obtaining a first camera parameter set including one or more camera parameters of the first camera and a second camera parameter set including one or more camera parameters of the second camera, (a3) calculating three-dimensional coordinate sets corresponding to overlapping regions each included in the first image and in the second image, based on the first image, the second image, the first camera parameter set, and the second camera parameter set, the overlapping region of the first image including an image of a portion of a subject, the overlapping region of the second image including an image of the portion, (a4) determining first pixel coordinate pairs based on the first camera parameter set by projecting the three-dimensional coordinate sets on the first image and second pixel coordinate pairs based on the second camera parameter set by projecting the three-dimensional coordinate sets on the second image, (a5) calculating an evaluation value, based on pixel values at the first pixel coordinate pairs on the first image and pixel values at the second pixel coordinate pairs on the second image, (a6) updating the first camera parameter set and the second camera parameter set, based on the evaluation value, and (a7) outputting the updated first camera parameter set and the updated second camera parameter set. According to the aspect described above, advantages similar to those of the camera parameter set calculation apparatus according to the aspect of the present disclosure can be achieved.

In the recording medium according to the aspect of the present disclosure, furthermore, the first image and the second image may be one of (i) a combination of images including an image obtained by a camera mounted on a front of a vehicle capturing an image of an area in front of the vehicle and an image obtained by a camera mounted on a left side of the vehicle capturing an image of an area on the left side of the vehicle, (ii) a combination of images including an image obtained by the camera mounted on the front of the vehicle capturing an image of an area in front of the vehicle and an image obtained by a camera mounted on a right side of the vehicle capturing an image of an area on the right side of the vehicle, (iii) a combination of images including an image obtained by a camera mounted on a rear of the vehicle capturing an image of an area behind the vehicle and an image obtained by the camera mounted on the left side of the vehicle capturing an image of an area on the left side of the vehicle, or (iv) a combination of images including an image obtained by the camera mounted on the rear of the vehicle capturing an image of an area behind the vehicle and an image obtained by the camera mounted on the right side of the vehicle capturing an image of an area on the right side of the vehicle.

In the recording medium according to the aspect of the present disclosure, furthermore, in (a5), the evaluation value may be calculated based on differences between the pixel values at the first pixel coordinate pairs on the first image and the pixel values at the second pixel coordinate pairs on the second image.

In the recording medium according to the aspect of the present disclosure, furthermore, the process may further include further obtaining a third image captured by a third camera and a third camera parameter set of the third camera, determining sets of two images among the first image, the second image, and the third image, and sequentially performing (a3) to (a5) on the sets of two images.

In the recording medium according to the aspect of the present disclosure, furthermore, alternatively, the process may further include further obtaining a third image captured by a third camera and a third camera parameter set of the third camera, determining sets of two images among the first image, the second image, and the third image, and performing (a3) to (a5) on the sets of two images to obtain pixel values and calculating the evaluation value by using the obtained pixel values.

In the recording medium according to the aspect of the present disclosure, furthermore, the first image and the second image may each include a first overlapping region including a portion of the subject, the second image and the third image may each include a second overlapping region including a portion of the subject, and the first overlapping region and the second overlapping region may not overlap each other.

In the recording medium according to the aspect of the present disclosure, furthermore, the first image and the second image may be images captured by the first camera and the second camera, respectively, the first camera and the second camera being arranged such that an optical axis of the first camera and an optical axis of the second camera are directed to intersect at centers of the optical axes.

It should be noted that general or specific aspects may be implemented as a system, an apparatus, a method, an integrated circuit, a computer program, or a computer-readable recording medium such as a recording disc, or any selective combination thereof. Examples of the computer-readable recording medium include a non-volatile recording medium such as a compact disc-read only memory CD-ROM.

A camera parameter set calculation apparatus and the like according to an embodiment will be described hereinafter with reference to the drawings. The following embodiment provides general or specific examples. Numerical values, shapes, materials, constituent elements, arrangement positions and connection forms of the constituent elements, steps, the order of the steps, and so on in the following embodiment are merely examples and are not intended to limit the present disclosure. The constituent elements mentioned in the following embodiment are described as optional constituent elements unless they are specified in the independent claim that defines the present disclosure in its broadest concept. The following description of the embodiment may include expressions with the term "approximately", such as approximately parallel or approximately perpendicular. For example, the expression "approximately parallel" is used to mean not only the state of being exactly parallel but also the state of being substantially parallel, that is, the state of being parallel with an error of several percent, for example. The same applies to other expressions with "approximately".

Embodiment

1. Configuration of On-Board Camera System

Figure 2:
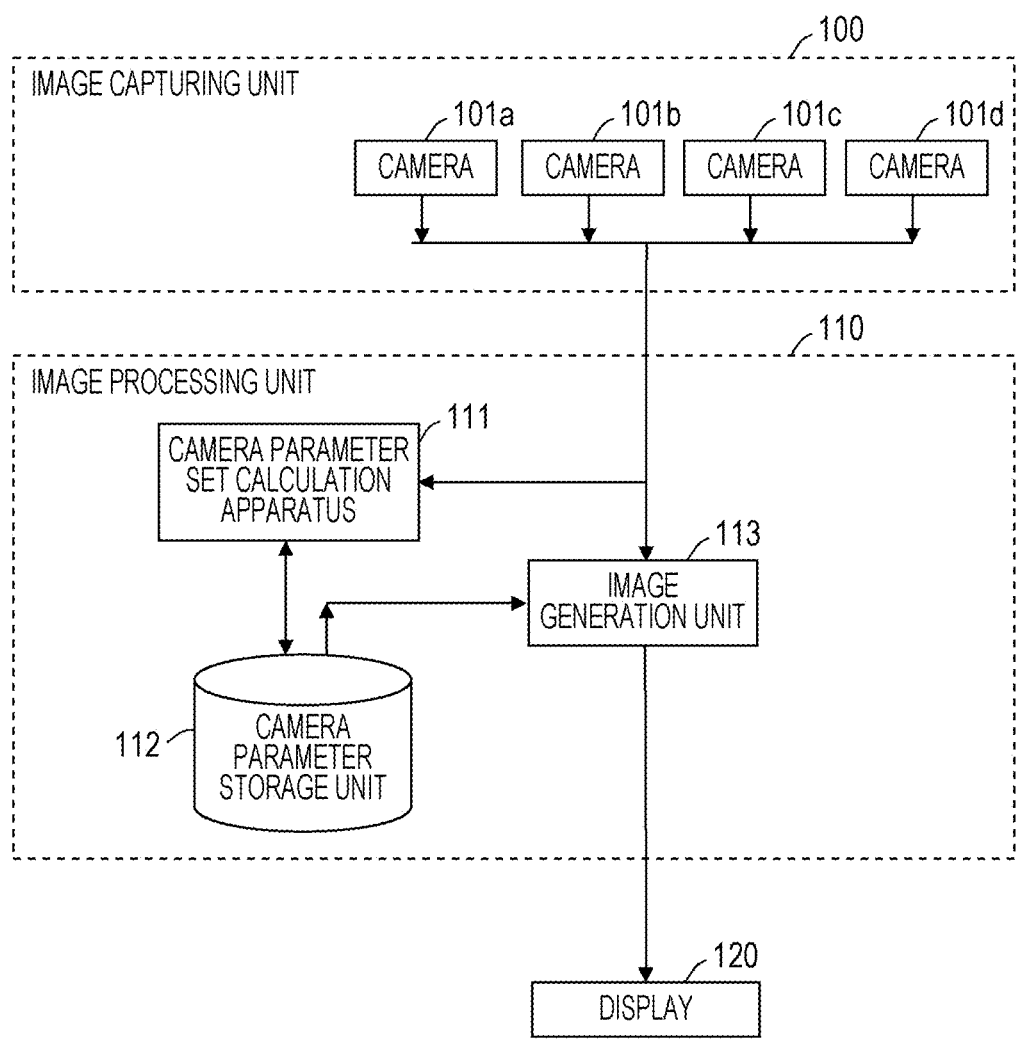
FIG. 2 is a block diagram illustrating the functional configuration of an on-board camera system according to an embodiment.

An on-board camera system 10 including a camera parameter set calculation apparatus 111 according to an embodiment of the present disclosure will be described. As a non-limiting example, in this embodiment, the on-board camera system 10 is described as a camera system mountable in a vehicle, which is an example of a mobile body. Referring to FIG. 2, illustrated is a block diagram illustrating the functional configuration of the on-board camera system 10 including the camera parameter set calculation apparatus 111 according to the embodiment. As illustrated in FIG. 2, the on-board camera system 10 includes an image capturing unit 100, an image processing unit 110, and a display 120. The on-board camera system 10 may be mounted in a vehicle, that is, a means of transport. For example, the on-board camera system 10 may be mounted in an automobile or a vehicle other than an automobile, or may be mounted in a ship or an aircraft. Examples of the vehicle other than an automobile include a truck, a bus, a two-wheeled vehicle, a vehicle for conveyance, a railroad, a construction machine, and cargo-handling equipment. Alternatively, the on-board camera system 10 may be mounted in a vehicle or robot remotely controlled by a user.

Figure 3:
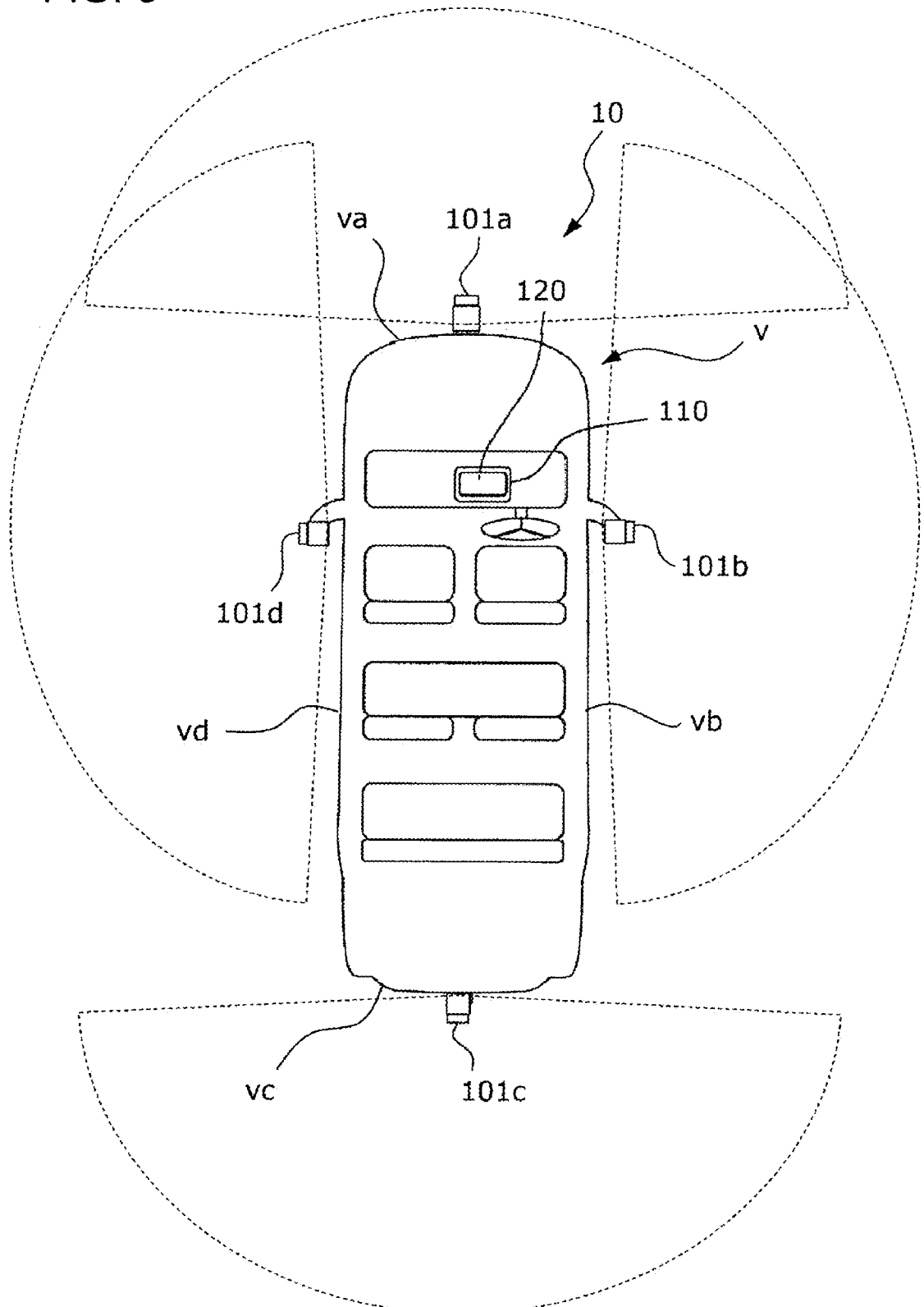
FIG. 3 illustrates an example of how the on-board camera system according to the embodiment is installed.

The image capturing unit 100 captures and obtains an image and outputs the image to the image processing unit 110. The image capturing unit 100 includes two or more cameras 101. In this embodiment, the image capturing unit 100 includes four cameras 101a, 101b, 101c, and 101d. For example, FIG. 3 illustrates an example of how the on-board camera system 10 according to the embodiment is mounted in a vehicle v. As a non-limiting example, in this embodiment, the four cameras 101a to 101d are disposed on the front va, right side vb, rear vc, and left side vd of the vehicle v, respectively, to capture images of areas in front of, on the right side of, behind, and on the left side of the vehicle v, respectively. The term "right side of the vehicle v" refers to the right-hand side when viewed from the rear. Therefore, the four cameras 101a to 101d are placed around the periphery of the vehicle v. As a non-limiting example, in this embodiment, the four cameras 101a to 101d capture and output images in synchronization with one another. The image processing unit 110 and the display 120 are placed in, for example, a passenger compartment of the vehicle v so as to be visible to the driver.

The four cameras 101a to 101d are oriented in different directions. In this embodiment, adjacent cameras mounted horizontally around the periphery of the vehicle v among the cameras 101a to 101d are oriented such that the optical axes thereof are directed to intersect at the centers of the optical axes. Specifically, the cameras 101a to 101d are directed outward radially. To capture a wide-area image, each of the four cameras 101a to 101d includes a fish-eye lens with a field of view of approximately 180 degrees. As indicated by broken lines in FIG. 3, each of the cameras 101a to 101d has a nearly hemispherical, cone-shaped field of view. Thus, the fields of view of adjacent cameras mounted horizontally around the periphery of the vehicle v have partially overlapping regions. In this embodiment, the fields of view of two cameras overlap, whereas the fields of view of three or more cameras do not overlap. However, this is not restrictive, and the fields of view of three or more cameras may overlap. The fields of view of the four cameras 101a to 101d can simultaneously cover the horizontal 360-degree surroundings of the vehicle v.

In this embodiment, the image capturing unit 100 in the on-board camera system 10 is constituted by four cameras. However, the number of cameras is not limited to four, and the image capturing unit 100 desirably includes two or more cameras. For example, the image capturing unit 100 may include two cameras mounted on the rear and left side of the vehicle v, instead of including four cameras mounted on the front, rear, and left and right sides of the vehicle v in the manner illustrated in FIG. 3.

Referring to FIG. 2 and FIG. 3, the image processing unit 110 processes images captured by the image capturing unit 100 and outputs a processing result to the display 120 or the like. The image processing unit 110 includes the camera parameter set calculation apparatus 111, a camera parameter storage unit 112, and an image generation unit 113. The camera parameter set calculation apparatus 111 is also referred to as a self-calibrator. The display 120 displays an image and so on output from the image processing unit 110. The display 120 may be constituted by a display panel such as a liquid crystal panel or an organic or inorganic electroluminescent (EL) panel. Similar constituent elements are denoted by reference numerals with the subscripts "a" to "d" to distinguish them from each other, but may be denoted by reference numerals without such subscripts in the following description if they are not individually distinguished.

The on-board camera system 10 mainly performs two operations, namely, image generation and self-calibration. In the image generation operation, the image capturing unit 100 captures images and outputs the captured images to the image processing unit 110, and the image processing unit 110 generates an image from the input images and outputs the generated image which is then displayed on the display 120. In the self-calibration operation, the image capturing unit 100 captures images and outputs the captured images to the image processing unit 110, and the camera parameter set calculation apparatus 111 in the image processing unit 110 updates a camera parameter set stored in the camera parameter storage unit 112. The two operations, namely, image generation and self-calibration, may be performed simultaneously or separately.

The image capturing unit 100 is constituted by the four cameras 101a to 101d, each including a fish-eye lens with a field of view of approximately 180 degrees. The four cameras 101a to 101d are arranged in the manner illustrated in FIG. 3. The four cameras 101a to 101d capture images of a subject within the respective fields of view and output four images (hereinafter also referred to as camera images). The four cameras 101a to 101d are arranged such that the fields of view of adjacent cameras partially overlap. For example, the fields of view of horizontally adjacent cameras among the four cameras 101a to 101d partially overlap. Specifically, a pair of cameras including the cameras 101a and 101b have overlapping fields of view, a pair of cameras including the cameras 101b and 101c have overlapping fields of view, a pair of cameras including the cameras 101c and 101d have overlapping fields of view, and a pair of cameras including the cameras 101d and 101a have overlapping fields of view.

As described above, the image processing unit 110 includes the camera parameter set calculation apparatus 111, the camera parameter storage unit 112, and the image generation unit 113.

The camera parameter storage unit 112 stores in advance at least the respective camera parameter sets of the cameras 101a to 101d and occlusion information that is information on regions occluded by the image capturing unit 100 within respective camera images obtained by the cameras 101a to 101d. The regions indicated by the occlusion information for the cameras 101a to 101d may be defined as regions that are included in the respective camera images and that are regions where portions of the image capturing unit 100 appear. The respective camera parameter sets of the cameras 101a to 101d may each include an extrinsic parameter set, such as the position and orientation of the corresponding one of the cameras 101a to 101d, and an intrinsic parameter set, such as the lens distortion and focal distance of the corresponding one of the cameras 101a to 101d.

The camera parameter set calculation apparatus 111, which is also a self-calibrator, uses the camera images captured by the four cameras 101a to 101d and the respective camera parameter sets of the cameras 101a to 101d stored in the camera parameter storage unit 112 to update the camera parameter sets stored in the camera parameter storage unit 112. The respective camera parameter sets of the cameras 101a to 101d stored in the camera parameter storage unit 112 are used as initial camera parameter sets. The initial camera parameter sets may be the respective camera parameter sets of the cameras 101a to 101d that have already been stored in the camera parameter storage unit 112. For example, the initial camera parameter sets may be camera parameter sets determined during the design of the cameras 101a to 101d or camera parameter sets configured in the cameras 101a to 101d during use.

The image generation unit 113 generates an image based on the camera images captured by the four cameras 101a to 101d and the camera parameter sets stored in the camera parameter storage unit 112 and outputs the image. For example, the image generation unit 113 generates a composite image based on the images captured by four cameras.

The constituent elements included in the image processing unit 110 in the on-board camera system 10 illustrated in FIG. 2 may be implemented by hardware such as electronic circuits or integrated circuits or may be implemented by software in accordance with a program or the like executed on a computer.

Figure 4:
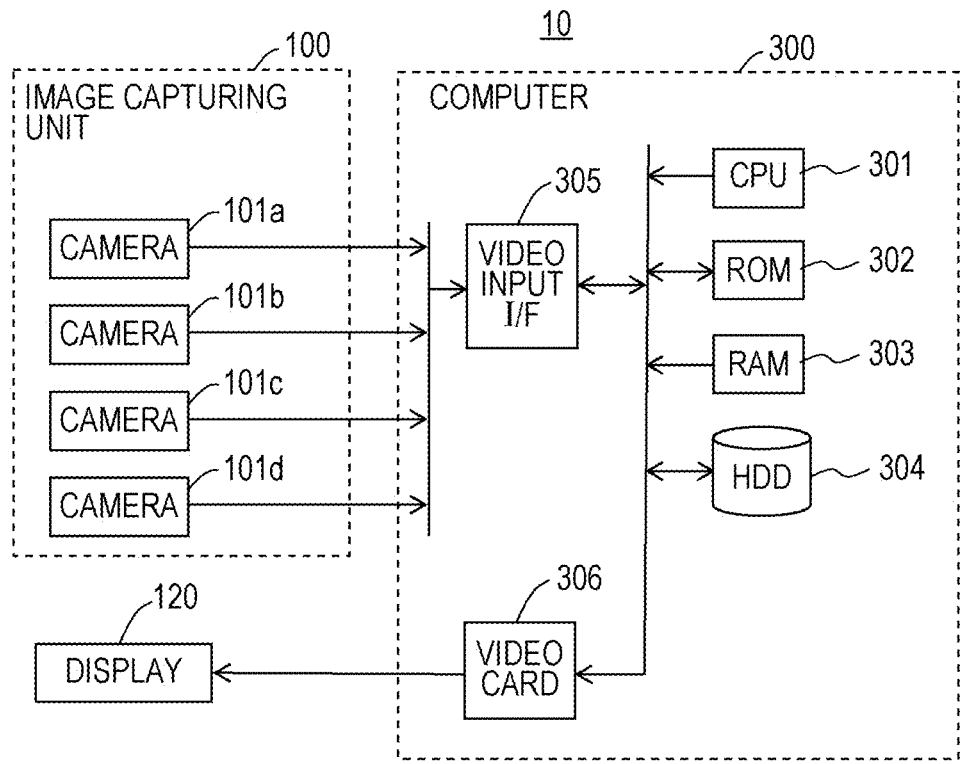
FIG. 4 is a block diagram of an image processing unit in the on-board camera system according to the embodiment, which is implemented by a computer.

For example, referring to FIG. 4, illustrated is an example hardware configuration of the on-board camera system 10, which is implemented by a computer. The on-board camera system 10 includes the image capturing unit 100, a computer 300 corresponding to the image processing unit 110, and the display 120. In the on-board camera system 10, the image capturing unit 100 captures and outputs images, and the computer 300 operates as the image processing unit 110 to generate an image and output the generated image. The display 120 displays the image generated by the computer 300.

The computer 300 includes a central processing unit (CPU) 301, a read only memory (ROM) 302, a random access memory (RAM) 303, a hard disk drive (HDD) 304, a video input interface (I/F) 305, and a video card 306.

A program for activating the computer 300 is held in advance in the ROM 302 or the HDD 304. The program is read into the RAM 303 from the ROM 302 or the HDD 304 by the CPU 301, which is a processor, and is expanded.

The CPU 301 executes each of the coded instructions in the program, which is expanded in the RAM 303. The video input I/F 305 loads the images captured by the image capturing unit 100 into the RAM 303 in accordance with execution of the program. The video card 306 processes an image generated in accordance with execution of the program and outputs the resulting image to the display 120, and the display 120 displays the image.

The computer program may not necessarily be stored in a semiconductor device, namely, the ROM 302 or the HDD 304, but may be stored in a recording medium such as a CD-ROM. The computer program may be transmitted via a wired or wireless network or via broadcasting or the like and may be loaded into the RAM 303 of the computer 300.

2. Operation of On-Board Camera System

The operation of the on-board camera system 10 will be described. Specifically, the operations of the on-board camera system 10 during image generation and during self-calibration will be described sequentially.

2-1. Operation During Image Generation

Figure 5:
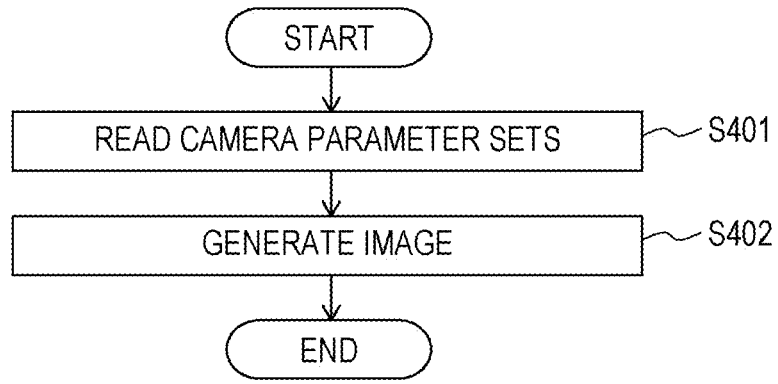
FIG. 5 is a flowchart illustrating an example of operation flow during image generation performed by the image processing unit according to the embodiment.

The operation of the on-board camera system 10 during image generation will be described with reference to FIG. 5. FIG. 5 is a flowchart illustrating an example of the operation of the image processing unit 110 in the on-board camera system 10 during image generation. As illustrated in FIG. 5, the operation during image generation includes the processing of step S401 for reading camera parameter sets and the processing of step S402 for generating an image. The processing operations illustrated in FIG. 5 may be executed by the computer 300 illustrated in FIG. 4.

As a non-limiting example, this embodiment provides an example in which the on-board camera system 10 is mounted in an automobile. Specifically, the on-board camera system 10 generates an image of 360-degree surroundings of the automobile by using captured camera images of areas in front of, behind, and on the left and right sides of the automobile, and displays the result on a display placed inside the automobile to accordingly present the state of the surroundings of the vehicle to the driver, or a user.

Figure 6:
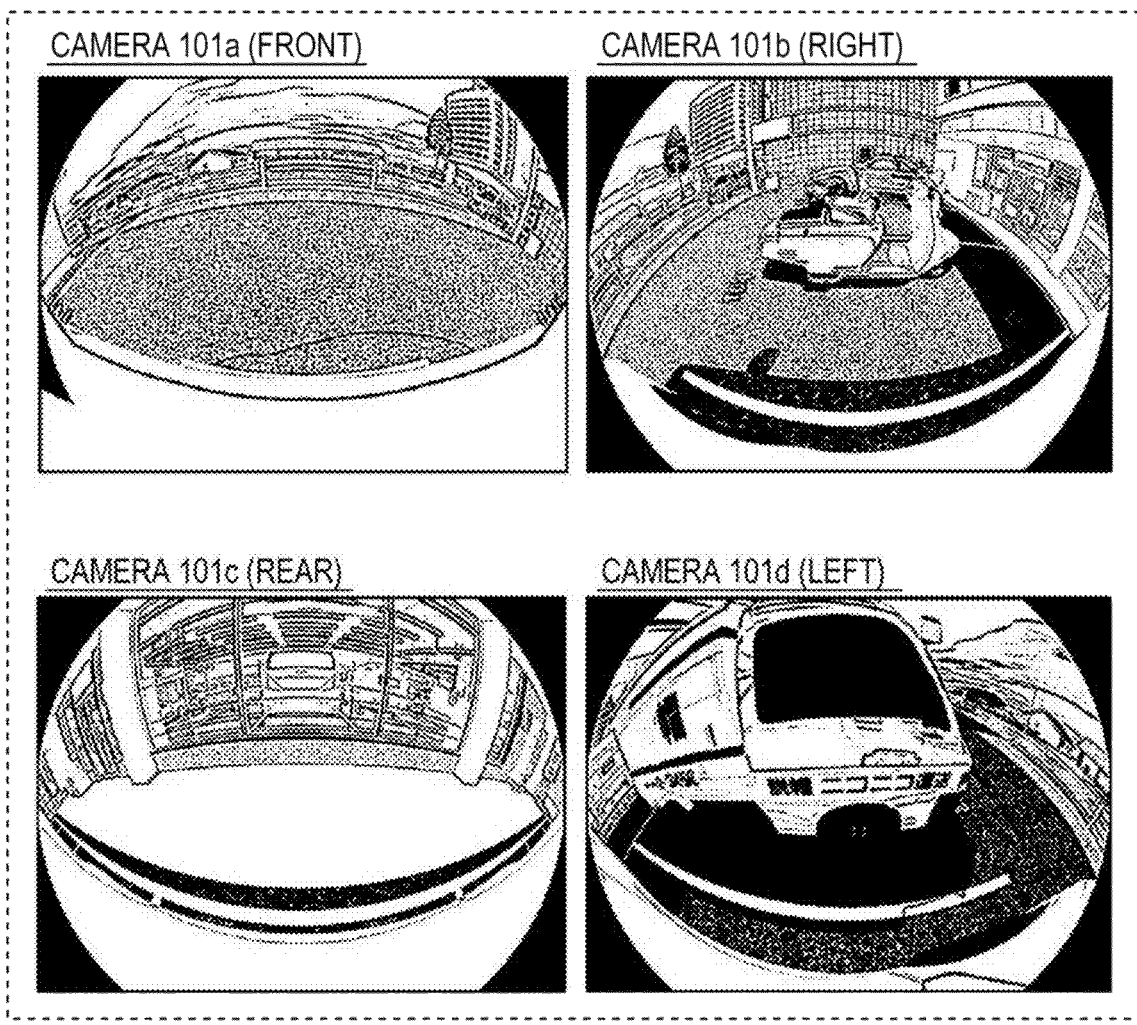
FIG. 6 is a schematic diagram illustrating an example of captured images according to the embodiment.

Referring to FIG. 6, illustrated is an example of images captured by the four cameras 101a to 101d in a situation where the four cameras 101a to 101d are mounted in the manner illustrated in FIG. 3. Each of the cameras 101a to 101d has a field of view of approximately 180 degrees. Camera images obtained from two adjacent cameras include a common subject.

The computer 300 executes a predetermined program during the operation of the image capturing unit 100 to perform the processing of steps S401 and S402 in FIG. 5. In the following, the details of the processing of steps S401 and S402, which is executed by the computer 300, will be described with reference to FIG. 2 and FIG. 5.

In step S401, the image generation unit 113 reads, from the camera parameter storage unit 112, the camera parameter sets stored in the camera parameter storage unit 112 in advance and including intrinsic parameter sets and extrinsic parameter sets of the cameras 101a to 101d. The relationship between an extrinsic parameter set M and a three-dimensional coordinate set and the relationship among an intrinsic parameter set (f, dpx, dpy, cu, cv), the three-dimensional coordinate set, and a pixel coordinate pair for the camera are represented by equations (1) to (3).

$$\begin{pmatrix} x_e \\ y_e \\ z_e \\ 1 \end{pmatrix} = M \begin{pmatrix} x_w \\ y_w \\ z_w \\ 1 \end{pmatrix}, \; M = \begin{pmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{pmatrix} \quad (1)$$

$$\begin{pmatrix} r_{00} & r_{01} & r_{02} \\ r_{10} & r_{11} & r_{12} \\ r_{20} & r_{21} & r_{22} \end{pmatrix} = \quad (2)$$

$$\begin{pmatrix} \cos Rz & -\sin Rz & 0 \\ \sin Rz & \cos Rz & 0 \\ 0 & 0 & 1 \end{pmatrix} \begin{pmatrix} \cos Ry & 0 & \sin Ry \\ 0 & 1 & 0 \\ -\sin Ry & 0 & \cos Ry \end{pmatrix} \begin{pmatrix} 1 & 0 & 0 \\ 0 & \cos Rx & -\sin Rx \\ 0 & \sin Rx & \cos Rx \end{pmatrix} =$$

$$\begin{pmatrix} \cos Ry \cos Rz & -\cos Rx \sin Rz + \sin Rx \sin Ry \cos Rz & \sin Rx \sin Rz + \cos Rx \sin Ry \cos Rz \\ \cos Ry \sin Rz & \cos Rx \cos Rz + \sin Rx \sin Ry \sin Rz & -\sin Rx \cos Rz + \cos Rx \sin Ry \sin Rz \\ -\sin Ry & \sin Rx \cos Ry & \cos Rx \cos Ry \end{pmatrix}$$

$$\left. \begin{array}{l} u = \dfrac{1}{dpx} f \dfrac{x_e}{z_e} + cu \\[6pt] v = \dfrac{1}{dpy} f \dfrac{y_e}{z_e} + cv \end{array} \right\} \quad (3)$$

In equation (1), the extrinsic parameter set M is an extrinsic parameter set representing a positional relationship between a world coordinate system and a camera coordinate system. The extrinsic parameter set M is expressed as a 4×4 matrix for converting a three-dimensional coordinate set $(x_w, y_w, z_w)$ in the world coordinate system into a three-dimensional coordinate set $(x_e, y_e, z_e)$ in the camera coordinate system. As given in equations (1) and (2), the extrinsic parameter set M represents the angles of rotation (Rx, Ry, Rx) about the X, Y, and Z axes of the world coordinate system and the amounts of translation $(t_x, t_y, t_z)$ along the X, Y, and Z axes. Equation (3) represents the relationship between the three-dimensional coordinate set $(x_e, y_e, z_e)$ of a certain point on a subject in the camera coordinate system and the pixel coordinate pair (u, v) of the image of the point in a camera image. In the intrinsic parameter set, f denotes the focal distance of the camera, dpx and dpy denote the pixel sizes of an imaging element of the camera in the x and y directions, respectively, and (cu, cv) denote a pixel coordinate pair of an intersection of the $z_e$ axis in the camera coordinate system and the imaging plane of the camera. When a digital image is considered as a set of "values (i.e., pixel values) at two-dimensional lattice points (i.e., pixel coordinate pairs)", the position of each pixel in the image is expressed as a two-dimensional pixel coordinate pair.

The extrinsic parameter set M and the intrinsic parameter set (f, dpx, dpy, cu, cv) are determined in advance by using the camera calibration method of the related art described above. The constraints in equations (1) to (3) are not sufficient for the calculation of the parameters dpx, dpy, and f. Thus, a design value may be used for one of the parameters dpx, dpy and f, and the two other parameters may be calculated by using the camera calibration method of the related art.

In equation (3), a perspective projection model (also referred to as a pinhole camera model) is used as a projection model of the lens, which is not intended to limit the projection model. Any other projection model such as an equidistant projection model, a stereographic projection model, or an equisolid angle projection model may be used. For example, when an equidistant projection model is used, an intrinsic parameter set given by equation (4) below is used instead of the intrinsic parameter set given by equation (3).

$$\left. \begin{array}{l} u = \dfrac{1}{dpx} \dfrac{x_e}{\sqrt{x_e^2 + y_e^2}} f\theta + cu \\[6pt] v = \dfrac{1}{dpy} \dfrac{y_e}{\sqrt{x_e^2 + y_e^2}} f\theta + cv \\[6pt] \theta = \tan^{-1}\left( \dfrac{\sqrt{x_e^2 + y_e^2}}{z_e} \right) \end{array} \right\} \quad (4)$$

In the following, for brevity of description, two cameras are sometimes represented as cameras i and j. In this case, extrinsic parameter sets $M_i$ and $M_j$, which represent positional relationships between the cameras i and j, can be given by equation (5) below.

$$\begin{pmatrix} x_j \\ y_j \\ z_j \\ 1 \end{pmatrix} = M_j M_i^{-1} \begin{pmatrix} x_i \\ y_i \\ z_i \\ 1 \end{pmatrix} = M_{i,j} \begin{pmatrix} x_i \\ y_i \\ z_i \\ 1 \end{pmatrix} \quad (5)$$

Furthermore, for example, a camera parameter set including the intrinsic parameter set and extrinsic parameter set of the camera 101a is denoted by $C_a$, as given by equation (6) below. Camera parameter sets including the intrinsic parameter sets and extrinsic parameter sets of the other cameras 101b to 101d can also be denoted by $C_b$, $C_c$, and $C_d$, respectively.

$$C_a = (f_a, dpx_a, dpy_a, cu_a, cv_a, M_a) \quad (6)$$

Figure 7:
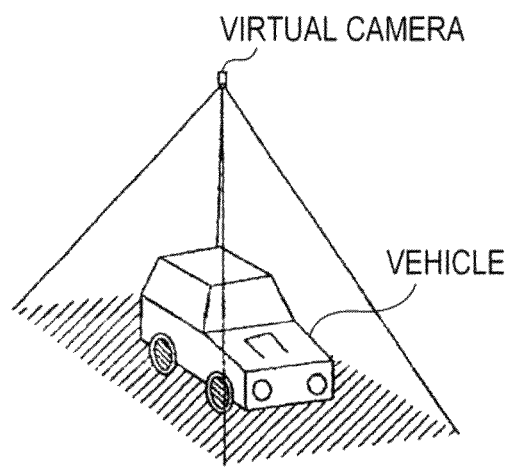
FIG. 7 is a schematic diagram illustrating an example of how a virtual camera is disposed in accordance with the embodiment.

In step S402, the image generation unit 113 obtains camera images $I_a$ to $I_d$ respectively captured by the four cameras 101a to 101d and the respective camera parameter sets $C_a$ to $C_d$ of the cameras 101a to 101d. Further, the image generation unit 113 maps the camera images $I_a$ to $I_d$ to a predetermined spatial model. In this embodiment, the predetermined spatial model is assumed to be implemented as a two-dimensional model with $z_w=0$. Further, the image generation unit 113 generates, as an image viewed from the virtual camera, a spatial model on which the camera images are projected, by using a camera parameter set Co of a predetermined virtual camera. In this embodiment, as illustrated in FIG. 7, a virtual camera located directly above the vehicle looking straight down at the surroundings of the vehicle is applied as the predetermined virtual camera. FIG. 7 is a schematic diagram illustrating an example arrangement of a virtual camera according to an embodiment. A technique for generating an image from camera images captured by cameras by using a spatial model is described in detail in, for example, Japanese Patent No. 3286306 and is well known, which is not described in further detail herein.

As described above, through the processing of steps S401 and S402 during the image generation operation, which is executed by the computer 300, the image processing unit 110 generates an image from four camera images captured by the image capturing unit 100 and outputs the generated image. The image capturing unit 100 and the computer 300 may repeatedly perform the process described above.

Figure 8:
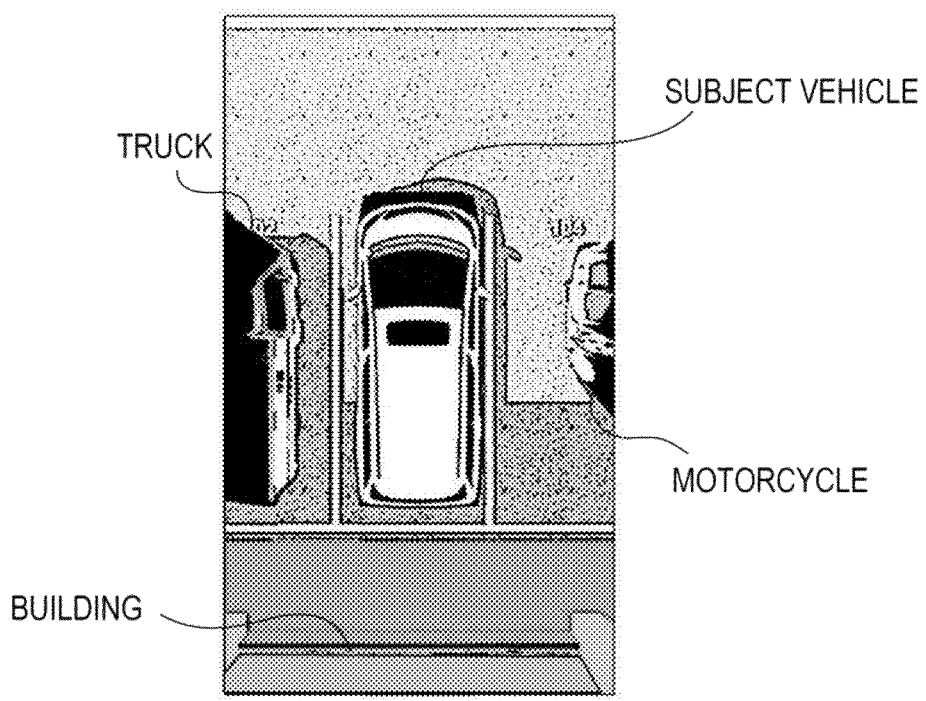
FIG. 8 is a schematic diagram illustrating an example of an image generated in accordance with the embodiment.

FIG. 8 illustrates an example of the image generated as a result of the processing of step S402. Referring to FIG. 8, the directions of obstacles around the subject vehicle and the distances of the obstacles from the vehicle can be easily recognized by the driver. In the example illustrated in FIG. 8, the obstacles are, for example, a truck on the left side, a motorcycle on the right side, and a building behind the vehicle.

As described above, as a result of the operations described above, the image capturing unit 100 in the on-board camera system 10, and the image processing unit 110 implemented by the computer 300 can generate and display an image of the 360-degree surroundings of the vehicle body from a viewpoint of a virtual camera by using camera images captured by four cameras mounted at different positions on the vehicle body. Consequently, the driver of an automobile including the on-board camera system 10 can readily identify a three-dimensional object such as an obstacle around the automobile.

2-2. Self-Calibration Operation

The on-board camera system 10 described above generates an image by using pre-recorded camera parameter sets. When a camera is manufactured and when a camera is mounted in a vehicle, a camera parameter set needs to be estimated, that is, camera calibration is necessary, since the camera parameter set includes differences from design values which are caused by an assembly error. Even when a camera is calibrated when assembled, the attached position of the camera may change due to deformation or the like caused by factors such as changes over time, external force, or temperature changes. For example, when the attached position of a camera changes due to changes over time, an image generated by using a camera parameter set obtained before the changes over time is not accurate because of, for example, a position shift of a subject in the generated image. Accordingly, camera calibration is also necessary when camera parameters change due to factors such as changes over time.

Figure 9:
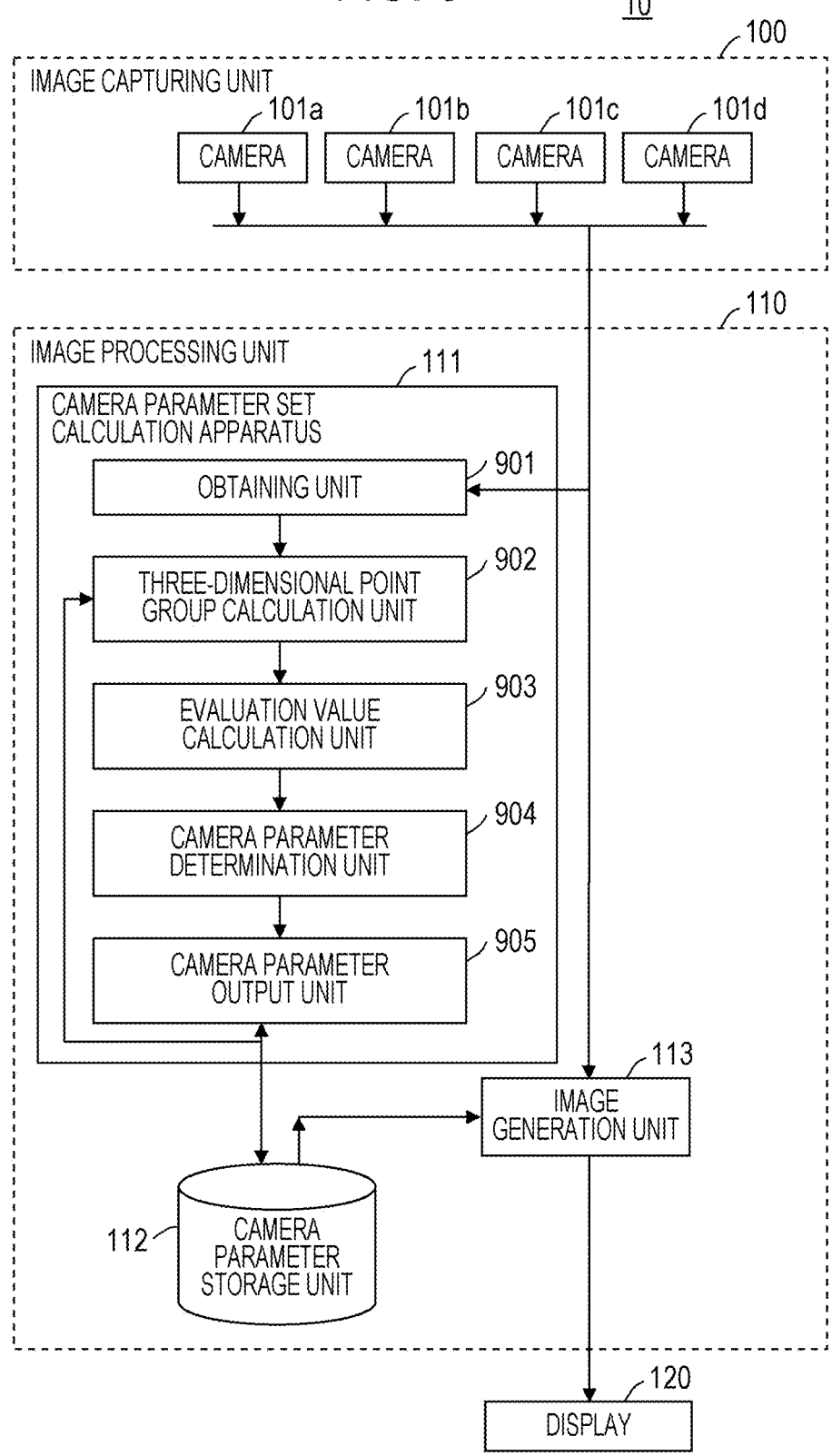
FIG. 9 is a schematic diagram illustrating the functional configuration of a camera parameter set calculation apparatus according to the embodiment.
Figure 10:
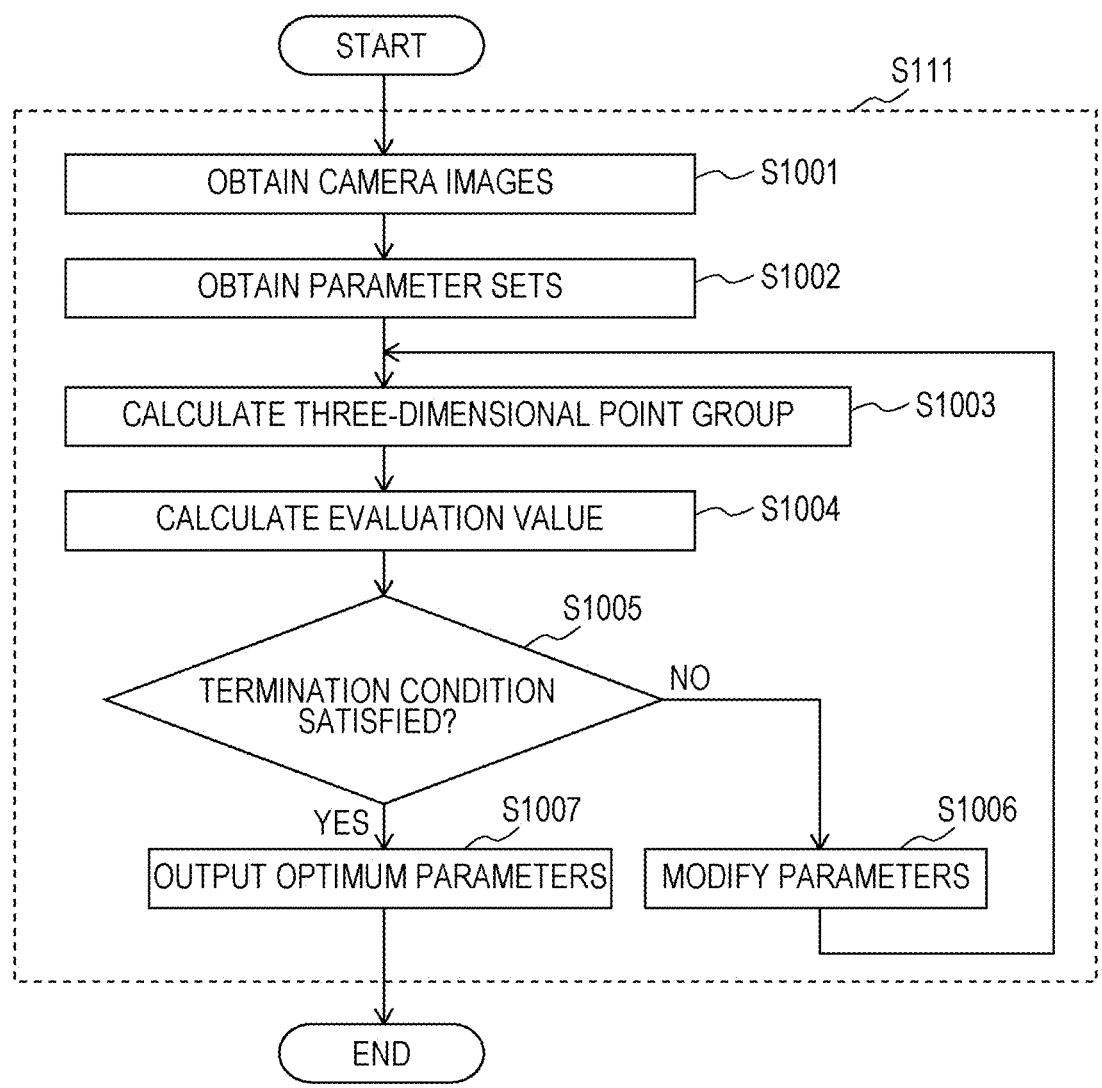
FIG. 10 is a flowchart illustrating an example of operation flow during self-calibration performed by the image processing unit according to the embodiment.

The operation of the on-board camera system 10 during self-calibration will be described hereinafter with reference to FIG. 9 and FIG. 10. FIG. 9 is a functional configuration diagram illustrating the detailed configuration of the camera parameter set calculation apparatus 111 in the on-board camera system 10 illustrated in FIG. 2. FIG. 10 is a flowchart illustrating an example of process flow during a self-calibration process S111 performed by the image processing unit 110 in the on-board camera system 10 according to the embodiment. The self-calibration process S111 is a process of the image processing unit 110 during a self-calibration operation and is executed by the computer 300 illustrated in FIG. 4.

As illustrated in FIG. 9, the camera parameter set calculation apparatus 111 in the image processing unit 110, which performs the self-calibration process S111, includes an obtaining unit 901, a three-dimensional point group calculation unit 902, an evaluation value calculation unit 903, a camera parameter determination unit 904, and a camera parameter output unit 905. The constituent elements implemented as the obtaining unit 901, the three-dimensional point group calculation unit 902, the evaluation value calculation unit 903, the camera parameter determination unit 904, and the camera parameter output unit 905 may have a configuration similar to that of the constituent elements of the image processing unit 110.

The obtaining unit 901 obtains from the image capturing unit 100 the camera images $I_a$ to $I_d$ respectively captured by the cameras 101a to 101d. The obtaining unit 901 may obtain the camera images $I_a$ to $I_d$ stored in a storage device such as a semiconductor memory (not illustrated) of the image capturing unit 100, the image processing unit 110, or the like. The obtaining unit 901 further obtains initial camera parameter sets, which are constituted by the camera parameters currently configured in the cameras 101a to 101d, from the camera parameter storage unit 112.

The three-dimensional point group calculation unit 902 estimates and extracts a set of corresponding points between two camera images obtained from two cameras, that is, a set of points each of which is included in one of the two camera images and which correspond to each other, and calculates pixel coordinate pairs of the corresponding points in the two camera images. When the two camera images include two images of the same subject, respectively, that is, when the one of the two camera images includes the one of the two images of the same point on the subject and the other of the two camera images includes the other of the two images of the same point on the subject, these two points are referred to as corresponding points. These two points are combined into a group which is referred to as a set of corresponding points. The estimation of a set of corresponding points specifically indicates the calculation of the pixel coordinate pairs of the corresponding points included in the set of corresponding points.

Further, the three-dimensional point group calculation unit 902 calculates a three-dimensional coordinate set of the point on the subject corresponding to the set of corresponding points by using a stereoscopic distance measurement technique, on the basis of the pixel coordinate pairs of the corresponding points included in the set of corresponding points and the initial camera parameter sets of the two cameras. The stereoscopic distance measurement technique is also called stereoscopy. In the stereoscopic distance measurement technique, two cameras positioned so as to capture images from different points of view and arranged so that their fields of view overlap are used to obtain the camera images, and a set of points each of which is included in one of the two camera images and which correspond to each other, that is, a set of corresponding points, is estimated. Further, a three-dimensional coordinate set of the point on the subject corresponding to the set of corresponding points is calculated by using the two corresponding points included in the set of corresponding points and predetermined information on the cameras, such as the positions and orientations of the cameras. In the following description, a point corresponding to the three-dimensional coordinate set calculated by the three-dimensional point group calculation unit 902 is also referred to as a distance measurement point.

The evaluation value calculation unit 903 calculates evaluation values of camera parameter sets on the basis of the pixel values of points obtained by projecting the three-dimensional coordinate set of the distance measurement point on the two camera images from which the set of corresponding points is estimated. In the following description, points on the two camera images which are obtained by projecting the distance measurement point on the two camera images are referred to as projected points. A projected point obtained by projecting a distance measurement point, which is based on a camera image $I_S$ obtained by a camera S capturing an image of a subject and a camera image $I_T$ obtained by a camera T capturing an image of the subject, on the camera image $I_S$ may be referred to as a first projected point, and a projected point obtained by projecting the same distance measurement point on the camera image $I_T$ may be referred to as a second projected point.

The camera parameter determination unit 904 determines whether to modify the camera parameter sets currently configured in the cameras 101a to 101d on the basis of the evaluation values calculated by the evaluation value calculation unit 903. In accordance with a determination result, the camera parameter determination unit 904 modifies, or updates, the camera parameter sets. The camera parameter determination unit 904 determines the camera parameter sets in this way. The camera parameter output unit 905 obtains the camera parameter sets determined by the camera parameter determination unit 904 and outputs the obtained camera parameter sets to the camera parameter storage unit 112 and so on.

As illustrated in FIG. 10, the camera parameter set calculation apparatus 111 performs the self-calibration process S111 including steps S1001 to S1007 to calibrate a set of camera parameters configured in each of the cameras 101a to 101d, that is, an initial camera parameter set. In the self-calibration process S111, the camera parameter set calculation apparatus 111 automatically performs a calibration process. When a user inputs a calibration instruction to the on-board camera system 10 through an input device (not illustrated) such as a switch, a touch pad, and a keyboard, the camera parameter set calculation apparatus 111 starts a self-calibration process for the cameras 101a to 101d. For example, the user may input a calibration instruction when they recognizes malfunctioning of the cameras 101a to 101d, or may input a calibration instruction before shipment from the factory after the cameras 101a to 101d have been manufactured. Alternatively, the camera parameter set calculation apparatus 111 may automatically start the self-calibration process at a preset time.

In the following, description is given of an operation of the camera parameter set calculation apparatus 111 for calibrating the camera parameter sets $C_a$ and $C_b$ of the two cameras 101a and 101b among the four cameras 101a to 101d when the user identifies the camera parameter set $C_a$ or $C_b$ of the camera 101a or 101b as including error.

Figure 11:
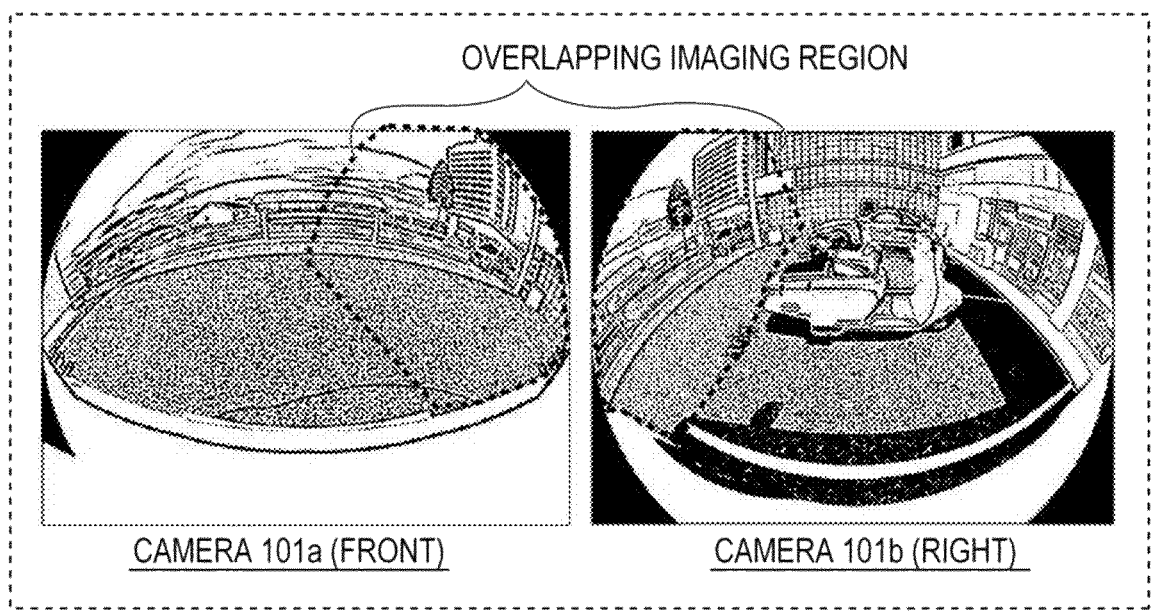
FIG. 11 is a schematic diagram illustrating an example of overlapping imaging regions in captured images according to the embodiment.

For example, FIG. 11 illustrates an example of images captured by the two cameras 101a and 101b, which are configured to capture images of areas in front of and on the right side of the vehicle, respectively, in the state in which the cameras 101a to 101d are mounted in the manner illustrated in FIG. 3. The camera images captured by the two cameras 101a and 101b include a subject, which is imaged by both cameras. These regions are hereinafter referred to as overlapping imaging regions.

When the user inputs a calibration instruction to the on-board camera system 10, the camera parameter set calculation apparatus 111 starts the self-calibration process S111. Then, in step S1001, the obtaining unit 901 obtains the camera images $I_a$ and $I_b$ respectively captured by the cameras 101a and 101b. Then, in step S1002, the obtaining unit 901 reads the respective initial camera parameter sets $C_{a0}$ and $C_{b0}$ of the cameras 101a and 101b, which are stored in the camera parameter storage unit 112 in advance. The term "in advance" may refer to "before the camera parameter set calculation apparatus 111 starts the self-calibration process".

In step S1003, the three-dimensional point group calculation unit 902 uses the obtained camera images $I_a$ and $I_b$ of the cameras 101a and 101b to estimate and extract N sets of corresponding points on the two camera images $I_a$ and $I_b$. The three-dimensional point group calculation unit 902 calculates and outputs coordinate sets of two corresponding points included in each set of corresponding points. Each of the coordinate sets includes a pixel coordinate pair $(u_{an}, v_{an})$ on the camera image $I_a$ and a pixel coordinate pair $(u_{bn}, v_{bn})$ on the camera image $I_b$. When the total number of the coordinate sets is N, the first coordinate set includes pixel coordinate pairs $(u_{a1}, v_{a1})$ and $(u_{b1}, v_{b1})$, . . . , and the Nth coordinate set includes pixel coordinate pairs $(u_{aN}, v_{aN})$ and $(u_{bN}, v_{bN})$. The three-dimensional point group calculation unit 902 further calculates and outputs three-dimensional coordinate sets $(x_{ar1}, y_{ar1}, z_{ar1})$, . . . , $(x_{arn}, y_{arn}, z_{arn})$, . . . , and $(x_{arN}, y_{arN}, z_{arN})$ of points on the subject, that is, distance measurement points, in accordance with the stereoscopic distance measurement technique by using the pixel coordinate pairs of the two corresponding points included in each of the N sets of corresponding points on the camera images $I_a$ and $I_b$ and by using the respective camera parameter sets $C_{ar}$ and $C_{br}$ of the cameras 101a and 101b. That is, the three-dimensional point group calculation unit 902 calculates three-dimensional coordinate sets of N distance measurement points. The distance measurement points each corresponding to sets of corresponding points.

The processing of steps S1003 to S1006 is repeatedly performed in accordance with the determination result of step S1005. Each time the processing of steps S1003 to S1006 is repeated, the respective camera parameter sets of the cameras 101a and 101b are updated. The respective camera parameter sets of the cameras 101a and 101b at the r-th iteration of the processing is represented as the camera parameter sets $C_{ar}$ and $C_{br}$, respectively. In the case of the initial camera parameter sets, r=0 holds.

The details of the processing of step S1003 will now be described. A camera image obtained by the camera 101a capturing an image of the subject is represented as the camera image $I_a$, and a camera image obtained by the camera 101b capturing an image of the subject is represented as the camera image $I_b$. The three-dimensional point group calculation unit 902 estimates and calculates a pixel coordinate pair $(u_{an}, v_{an})$ at which the camera image $I_a$ has an image of a point Pn on the subject and a pixel coordinate pair $(u_{bn}, v_{bn})$ at which the camera image $I_b$ has an image of the point Pn, on the basis of, for example, the similarity of the images, the brightness constraint and the smoothness constraint described below, and so on. A set of pixel coordinate pairs $\{(u_{an}, v_{an}), (u_{bn}, v_{bn})\}$ is a set of pixel coordinate pairs that are respectively included in the two camera images and that correspond to each other. When a point included in the camera image $I_a$ and a point included in the camera image $I_b$ correspond to each other, these corresponding points is combined into a group which may be expressed as a set of pixel coordinate pairs corresponding to the set of corresponding points. In the example camera images illustrated in FIG. 11, the respective pixel coordinate pairs $(u_{an}, v_{an})$ and $(u_{bn}, v_{bn})$ of the corresponding points on the two camera images $I_a$ and $I_b$ can be expected to be obtained within the overlapping imaging regions on the camera images obtained by the cameras 101a and 101b.

When the pixel coordinate pair $(u_{an}, v_{an})$ on the camera image $I_a$ and the pixel coordinate pair $(u_{bn}, v_{bn})$ on the camera image $I_b$ are pixel coordinate pairs of the two corresponding points included in the set of corresponding points, pixel values $I_a(u_{an}, v_{an})$ and $I_b(u_{bn}, v_{bn})$ at the two corresponding points, that is, at the two pixel coordinate pairs, are equal. This is called the brightness constraint. Furthermore, since a certain subject occupies adjacent pixels on a camera image, points, included in the camera image $I_b$ and corresponding to points identified with pixels adjacent to a point identified with the pixel coordinate pair $(u_{an}, v_{an})$ on the camera image $I_a$, are likely to be located near a point identified with the pixel coordinate pair $(u_{bn}, v_{bn})$ on the camera image $I_b$. This is called the smoothness constraint. A set of corresponding points between the camera images $I_a$ and $I_b$ (a set of corresponding pixel coordinate pairs between the camera images $I_a$ and $I_b$) can be obtained by estimating a collection of sets of pixel coordinate pairs $(u_{an}, v_{an})$ and $(u_{bn}, v_{bn})$ that most satisfy the two conditions described above, namely, the brightness constraint and the smoothness constraint.

A corresponding point search method or a motion estimation method for estimating pixel coordinate pairs of two corresponding points included in a set of corresponding points between two camera images with the precision of a real number is well known and is described in detail in, for example, C. Zach, T. Pock, and H. Bischof, "A Duality Based Approach for Realtime TV-L$^1$ Optical Flow", in Proceedings of the 29th DAGM conference on Pattern recognition, 2007, p. 214-223, which is not described in detail herein.

The three-dimensional point group calculation unit 902 further calculates a three-dimensional coordinate set $(x_{arn}, y_{arn}, z_{arn})$ of a point (distance measurement point) on the subject corresponding to each of the estimated sets of corresponding points in accordance with equation (3) above by using the coordinate pairs $(u_{an}, v_{an})$ and $(u_{bn}, v_{bn})$ of the two corresponding points included in the set of corresponding points and by using the camera parameter sets $C_{ar}$ and $C_{br}$ of the cameras 101a and 101b. The three-dimensional coordinate sets are each assumed to be a set of coordinate values in the camera coordinate system of the camera 101a. A binocular stereo method for calculating a three-dimensional coordinate set of a point (distance measurement point) on the subject corresponding to a set of corresponding points between two camera images on the basis of coordinate pairs of the two corresponding points included in the set of corresponding points and on the basis of two camera positions, and transformation of coordinate values between two three-dimensional coordinate systems are well known and are described in detail in, for example, Takashi MATSUYAMA et al., eds. "Computer Vision", Shin-Gijutsu Communications, p. 123-137, which is not described in detail herein.

For simplicity of the following description, a process for calculating a three-dimensional coordinate set $(x_{arn}, y_{arn}, z_{arn})$ of a point (distance measurement point) on the subject corresponding to a set of corresponding points in accordance with equation (3) above by using coordinate pairs $(u_{an}, v_{an})$ and $(u_{bn}, v_{bn})$ of the two corresponding points included in the set of corresponding points and by using the camera parameter sets $C_{ar}$ and $C_{br}$ of the cameras 101a and 101b, is represented by equation (7) using a function F. The points included in the set of corresponding points correspond to each other. The one of the points is included in a camera image obtained by the camera 101a capturing an image of a subject and the other of the points is included in a camera image obtained by the camera 101b capturing an image of the subject. Through the processing of step S1003 described above, the three-dimensional point group calculation unit 902 calculates three-dimensional coordinate sets of N points (distance measurement points) on the subject corresponding to sets of corresponding points on the two camera images.

$$(x_{arn}, y_{arn}, z_{arn}) = F(u_{an}, v_{an}, u_{bn}, v_{bn}, C_{ar}, C_{br}) r=0 \ldots R, n=1 \ldots N \quad (7)$$

Further, in step S1004, the evaluation value calculation unit 903 projects each of the N distance measurement points on the camera images $I_a$ and $I_b$ captured by the cameras 101a and 101b by using the three-dimensional coordinates of the N distance measurement points and the camera parameter sets $C_{ar}$ and $C_{br}$ of the cameras 101a and 101b. Then, the evaluation value calculation unit 903 calculates, for each distance measurement point, a first projected point on the camera image $I_a$ and a second projected point on the camera image $I_b$, each of the first projected point and the second projected point being obtained by projecting the distance measurement point. The phrase "projecting each distance measurement point on camera images" refers to performing, by the evaluation value calculation unit 903, coordinate transformation from a three-dimensional coordinate set of each distance measurement point to a pixel coordinate pair on the camera images $I_a$ and $I_b$ in accordance with equations (8) and (9) below. Accordingly, the evaluation value calculation unit 903 calculates, for each distance measurement point, a pixel coordinate pair $(u_{arn}, y_{arn})$ of the first projected point on the camera image $I_a$ and a pixel coordinate pair $(u_{brn}, v_{brn})$ of the second projected point on the camera image $I_b$. In equation (8), the function G represents coordinate transformation based on equations (1) to (3) and (5) above from the three-dimensional coordinate set of the distance measurement point to the pixel coordinate pair on the camera image $I_a$. In equation (9), the function H represents coordinate transformation based on equations (1) to (3)

and (5) above from the three-dimensional coordinate set of the distance measurement point to the pixel coordinate pair on the camera image $I_b$.

$$(u_{arn}, v_{arn}) = G(x_{arn}, y_{arn}, z_{arn}, C_{ar}) r=0 \ldots R, n=1 \ldots N \quad (8)$$

$$(u_{brn}, v_{brn}) = H(x_{arn}, y_{arn}, z_{arn}, C_{ar}, C_{br}) r=0 \ldots R, n=1 \ldots N \quad (9)$$

Further, the evaluation value calculation unit 903 calculates a pixel value iar of the first projected point, which is obtained by projecting the distance measurement point on the camera image $I_a$, and a pixel value ibr of the second projected point, which is obtained by projecting the same distance measurement point on the camera image $I_b$, by using the camera images $I_a$ and $I_b$ and the camera parameter sets $C_{ar}$ and $C_{br}$. For example, the pixel coordinate pair of the first projected point is represented as $(u_{arn}, v_{arn})$, and the pixel coordinate pair of the second projected point is represented as $(u_{brn}, v_{brn})$. In this case, the pixel value iar of the first projected point is represented as $I_a(u_{arn}, v_{arn})$, and the pixel value ibr of the second projected point is represented as $I_b(u_{brn}, v_{brn})$. The evaluation value calculation unit 903 calculates the pixel values of the first projected points and the pixel values of the second projected points for the respective distance measurement points. Then, the evaluation value calculation unit 903 calculates an evaluation value J, which is defined by the total sum of the absolute values of the differences between the pixel values iar of the first projected points and the pixel values ibr of the second projected points, on the basis of an evaluation function given in equation (10).

$$J = \frac{1}{N} \sum_{n=1}^{N} |I_a(u_{am}, v_{am}) - I_b(u_{bm}, v_{brn})| \quad (10)$$

In equation (10), N denotes the number of distance measurement points and corresponds to all of the points identified with the three-dimensional coordinate sets $(x_{arn}, y_{arn}, z_{arn})$ calculated in step S1003. The pixel coordinate pairs $(u_{arn}, y_{arn})$ and $(u_{brn}, v_{brn})$ are the pixel coordinate pairs of the first and second projected points for the n-th distance measurement point on the camera image $I_a$ captured by the camera 101*a* and the camera image $I_b$ captured by the camera 101*b*, respectively. The pixel coordinate pair $(u_{arn}, y_{arn})$ is calculated by using the three-dimensional coordinate set $(x_{arn}, y_{arn}, z_{arn})$ and the camera parameter set $C_{ar}$ of the camera 101*a*. The pixel coordinate pair $(u_{brn}, v_{brn})$ is calculated by using the three-dimensional coordinate set $(x_{arn}, y_{arn}, z_{arn})$ and the camera parameter set $C_{br}$ of the camera 101*b* in accordance with equation (3) above. The pixel value $I_a(u_{arn}, y_{arn})$ is a pixel value at the pixel coordinate pair $(u_{arn}, y_{arn})$ on the camera image $I_a$, and the pixel value $I_b(u_{brn}, v_{brn})$ is a pixel value at the pixel coordinate pair $(u_{brn}, v_{brn})$ on the camera image $I_b$, where brightness values are used here.

In this embodiment, furthermore, each pixel value is a brightness value of one pixel. Each pixel value is calculated by using bicubic interpolation for a pixel coordinate pair having the precision of real numbers. Each pixel value is not limited to a brightness value and may be implemented as a red-green-blue (RGB) value instead of a brightness value. In addition, the method for calculating a pixel value for a pixel coordinate pair having the precision of real numbers is not limited to bicubic interpolation and may be based on any other interpolation method such as bilinear interpolation.

Furthermore, during the computation of the evaluation value J, the sum of the absolute values of the differences between the pixel values of the first projected points and the pixel values of the second projected points for the N distance measurement points may be calculated by weighting the absolute values of the differences between the pixel values. For example, a greater weight may be applied to a group of points at which the color of the subject changes continuously, or a greater weight may be applied to a group of points at which the surface irregularities of the subject are large. Such weighting can be expected to have the advantage of making the change in the evaluation value J smooth against continuous changes in camera parameters and facilitating minimization of the evaluation value J.

Then, in step S1005, the camera parameter determination unit 904 determines whether a condition for terminating the process for updating the camera parameter sets $C_{ar}$ and $C_{br}$ of the cameras 101*a* and 101*b* is satisfied. If the termination condition is not satisfied (NO in step S1005), the camera parameter determination unit 904 proceeds to step S1006 to modify the camera parameter sets $C_{ar}$ and $C_{br}$. If the termination condition is satisfied (YES in step S1005), the camera parameter determination unit 904 terminates the process for updating the camera parameter sets, determines the updated, latest camera parameter sets $C_{ar}$ and $C_{br}$ as the respective camera parameter sets of the cameras 101*a* and 101*b*, and outputs the determined camera parameter sets. Then, the camera parameter determination unit 904 proceeds to step S1007. The termination condition includes at least one of the conditions in which a given search range of camera parameters has been searched, the evaluation value J is less than a first threshold, and the number of times r the processing of steps S1003 to S1006 has been repeatedly performed is greater than a second threshold.

In step S1006, the camera parameter determination unit 904 modifies, or updates, the camera parameter sets in the (r+1)-th iteration. Specifically, the camera parameter determination unit 904 modifies the camera parameter sets $C_{ar}$ and $C_{br}$ of the cameras 101*a* and 101*b* within a given range and calculates new camera parameter sets $C_{ar+1}$ and $C_{br+1}$. The camera parameter determination unit 904 outputs the camera parameter sets $C_{ar+1}$ and $C_{br+1}$ and then returns to step S1003. Accordingly, the (r+1)-th iteration having the series of processing operations in steps S1003 to S1006 is performed. The search range of the camera parameters may be a preset range that each of the camera parameters can take. For example, the search range may be ±5% of each of the initial camera parameters.

In step S1007, the camera parameter output unit 905 obtains sets each including the camera parameter sets calculated through the iteration of the processing of steps S1003 to S1006 described above and the evaluation value J corresponding to the camera parameter sets. The evaluation value J corresponding to the camera parameter sets is an evaluation value calculated by using the camera parameter sets. The camera parameter output unit 905 selects camera parameter sets included in the set having the smallest evaluation value J from among the sets of camera parameter sets and evaluation values J. If the evaluation value J corresponding to the selected camera parameter sets is smaller than the evaluation value J corresponding to the initial camera parameter sets, the camera parameter output unit 905 replaces the initial camera parameter sets stored in the camera parameter storage unit 112 with the selected camera parameter sets. Accordingly, each camera parameter set is updated with an optimum camera parameter set. The operation of steps S1003 to S1007 described above can be expressed by equation (11) below. The processing of steps S1001 to S1007 may be executed by the computer 300 illustrated in FIG. 4.

$$\arg\min_{Car, Cbr} (J) = \operatorname*{argmin}_{Car, Cbr} \frac{1}{N} \sum_{n=1}^{N} |I_a(u_{am}, v_{am}) - I_b(u_{bm}, v_{bm})| \qquad (11)$$

$$(u_{am}, v_{am}) = G(x_{am}, y_{am}, z_{am}, C_{ar} \quad r = 0 \ldots R, n = 1 \ldots N$$

$$(u_{bm}, v_{bm}) = H(x_{am}, y_{am}, z_{am}, C_{ar}, C_{br}) \quad r = 0 \ldots R, n = 1 \ldots N$$

$$(x_{am}, y_{am}, z_{am}) = F(u_{an}, v_{an}, u_{bn}, v_{bn}, C_{ar}, C_{br})$$

As described above, the camera parameter set calculation apparatus 111 performs the self-calibration process S111 to calculate a three-dimensional coordinate set of a point (distance measurement point) on the subject corresponding to each of the sets of corresponding points from the camera images obtained by the cameras 101a and 101b by using stereoscopic distance measurement. Further, the camera parameter set calculation apparatus 111 calculates a pixel coordinate pair of a first projected point obtained by projecting the distance measurement point on the camera image $I_a$ and a pixel coordinate pair of a second projected point obtained by projecting the same distance measurement point on the camera image $I_b$ and calculates an evaluation value on the basis of a difference between the pixel value of the first projected point and the pixel value of the second projected point. The camera parameter set calculation apparatus 111 calculates the camera parameter sets $C_{ar}$ and $C_{br}$ of the cameras 101a and 101b for which a minimum evaluation value is obtained, thereby obtaining camera parameter sets having correct values or having a small error from the correct values.

If the camera parameter sets $C_{ar}$ and $C_{br}$ of the cameras 101a and 101b are correct, the three-dimensional coordinate set ($x_{arn}$, $y_{arn}$, $z_{arn}$) corresponding to the set of corresponding points is correct. In addition, the pixel value $I_a(u_{arn}, y_{arn})$ of the first projected point on the camera image obtained by the camera 101a and the pixel value $I_b(u_{brn}, v_{brn})$ of the second projected point on the camera image obtained by the camera 101b, which correspond to the three-dimensional coordinate set, are equal, and the evaluation value J given by equation (10) above is 0. In contrast, when the camera parameter sets $C_{ar}$ and $C_{br}$ are farther away from the correct values (i.e., the camera parameter sets $C_{ar}$ and $C_{br}$ include a larger amount of error), a larger difference occurs between the pixel values, making the evaluation value J given by equation (10) greater. In other words, the smaller the evaluation value J, the closer the camera parameter sets $C_{ar}$ and $C_{br}$ are to the true. Accordingly, through the operation of steps S1001 to S1007 described above, the camera parameter sets $C_{ar}$ and $C_{br}$ are determined based on a difference between the pixel value $I_a(u_{arn}, v_{arn})$ and the pixel value $I_b(u_{brn}, v_{brn})$ corresponding to the three-dimensional coordinate set ($x_{arn}$, $y_{arn}$, $z_{arn}$) such that the camera parameter sets $C_{ar}$ and $C_{br}$ minimize the difference, thereby determining correct camera parameter sets of the cameras 101a and 101b. That is, the camera 101a and the camera 101b can be calibrated.

The operation of the on-board camera system 10 described above during self-calibration does not require the correspondences between a point whose three-dimensional coordinate set is known, such as a reference point on a calibration marker, and a pixel coordinate pair. Thus, there are advantages in that equipment such as a calibration marker is not required. In addition, a specific subject whose three-dimensional coordinates are known is not used, and thus there are advantages in that correct camera calibration is achieved even if factors that change in the three-dimensional coordinate set of a specific subject, such as changes over time, deformation under external force, or temperature changes, occur.

3. Verification of Effects of Self-Calibration Process

In the following, verification of accurate calculation of the camera parameters of the cameras 101a and 101b through the self-calibration process S111 performed by the camera parameter set calculation apparatus 111, described above, will be described with reference to experimental results with simulation.

In order to calculate a camera parameter having a small error from the correct value of the camera parameter on the basis of the evaluation function for the evaluation value J given by equation (10) above, the evaluation function in equation (10) needs to satisfy the following two conditions.

(i) If the camera parameter is the correct value, the evaluation value J is minimum.

(ii) The evaluation function has a linear shape that is convex downward around the correct value of the camera parameter.

The evaluation function for the evaluation value J given by equation (10), which satisfies the two conditions (i) and (ii) described above, will be described with reference to experimental results below, taking as an example the case where the camera images illustrated in FIG. 11 are input as camera images captured by the cameras 101a and 101b.

Experimental Condition 1

In experimental condition 1, an experiment was carried out so as to calculate an evaluation value while modifying one of the camera parameters of a camera and compare the calculated evaluation value with a pre-known correct value of the camera parameter. In each of the camera parameter sets of the cameras 101a and 101b, the intrinsic parameter set includes a total of five parameters, namely, the pixel coordinate pair (cu, cv) of the center of the optical axis of the camera, the focal distance f of the camera, and the respective lengths dpx and dpy of one pixel of the imaging element of the camera in the x and y directions, in accordance with the equidistant projection model given in equation (4) above. The extrinsic parameter set M is given by equation (12) below, which is similar to equations (1) and (2) above. The extrinsic parameter set M includes, as specific amounts of displacement of the camera coordinate system relative to the world coordinate system, a total of six parameters, namely, the amounts of rotation $R_X$, $R_Y$ and $R_Z$ about the X, Y, and Z axes, respectively, and the amounts of translation $T_X$, $T_Y$ and $T_Z$ along the X, Y, and Z axes, respectively. The camera parameter sets of the two cameras 101a and 101b include 22 parameters in total. The X, Y, and Z axes are the reference axes in the world coordinate system.

$$\begin{pmatrix} x_e \\ y_e \\ z_e \\ 1 \end{pmatrix} = M \begin{pmatrix} x_w \\ y_w \\ z_w \\ 1 \end{pmatrix} \quad (12)$$

$$M = \begin{pmatrix} r_{00} & r_{01} & r_{02} & t_X \\ r_{10} & r_{11} & r_{12} & t_Y \\ r_{20} & r_{21} & r_{22} & t_Z \\ 0 & 0 & 0 & 1 \end{pmatrix}$$

$$= \begin{pmatrix} 1 & 0 & 0 & T_X \\ 0 & 1 & 0 & T_Y \\ 0 & 0 & 1 & T_Z \\ 0 & 0 & 0 & 1 \end{pmatrix} \begin{pmatrix} \cos R_Z & -\sin R_Z & 0 & 0 \\ \sin R_Z & \cos R_Z & 0 & 0 \\ 0 & 0 & 1 & 0 \\ 0 & 0 & 0 & 1 \end{pmatrix}$$

$$\begin{pmatrix} \cos R_Y & 0 & \sin R_Y & 0 \\ 0 & 1 & 0 & 0 \\ -\sin R_Y & 0 & \cos R_Y & 0 \\ 0 & 0 & 0 & 1 \end{pmatrix} \begin{pmatrix} 1 & 0 & 0 & 0 \\ 0 & \cos R_X & -\sin R_X & 0 \\ 0 & \sin R_X & \cos R_X & 0 \\ 0 & 0 & 0 & 1 \end{pmatrix}$$

Since the parameters dpx and f and the parameters dpy and f are difficult to uniquely determine due to scale uncertainty, the parameter dpy is set to a design value (fixed). When camera images obtained by cameras mounted in the manner illustrated in FIG. 3 are used, the amount of translation $T_X$ in the baseline length direction (e.g., the X-axis direction) among the camera parameters of each of the two cameras is also difficult to uniquely determine due to scale uncertainty. Thus, the parameter $T_X$ is set to a design value (fixed). Accordingly, the evaluation value J is a function whose variables are nine camera parameters of each camera, namely, cu, cv, f, dpx, $R_X$, $R_Y$, $R_Z$, $T_Y$, and $T_Z$.

FIG. 11 illustrates images used in the experiment. In FIG. 11, an example of camera images showing a scene in a parking lot is illustrated. The camera images were generated using computer graphics (CG). The camera images illustrated in FIG. 11 are camera images obtained by the cameras 101a and 101b. In this experiment, a pre-known correct value for the set of corresponding points was used, instead of a set of corresponding points between the camera images illustrated in FIG. 11 being calculated by the three-dimensional point group calculation unit 902.

The correct values for the set of corresponding points were used as input values, and all of the camera parameters of the cameras 101a and 101b were set to the correct values, namely, design values. Thereafter, one of the camera parameters of the camera 101b was changed. Evaluation values J in this case were calculated.

Experimental Results 1

Experimental results 1 obtained under experimental condition 1, described above, will be described. Specifically, for the nine camera parameters, evaluation values in the vicinity of the correct values were obtained as depicted in FIGS. 12A to 14B. In FIGS. 12A to 14B, the horizontal axis represents the values of the respective camera parameters, and the vertical axis represents evaluation values J. FIG. 12A, FIG. 12B, FIG. 12C, FIG. 12D, FIG. 13A, FIG. 13B, FIG. 13C, FIG. 14A, and FIG. 14B illustrate the camera parameters to be changed, namely, cu, cv, f, dpx, $R_X$, $R_Y$, $R_Z$, $T_Y$, and $T_Z$, respectively.

The correct values are 640 pixels for the camera parameter cu, 480 pixels for the camera parameter cv, 1.12 mm for the camera parameter f, 2.75 μm for the camera parameter dpx, 0° for the camera parameter $R_X$, 0° for the camera parameter $R_Y$, 0° for the camera parameter $R_Z$, 0 mm for the camera parameter $T_Y$, and 0 mm for the camera parameter $T_Z$. In FIGS. 12A to 14B, the correct values for the respective camera parameters appear at the center of the horizontal axis.

As seen from FIGS. 12A to 14B, each of the evaluation functions draws a linear line that is convex downward around the correct value of the camera parameter (the center of the horizontal axis) and a camera parameter for which the evaluation value is minimum matches the correct value. It is therefore concluded that a camera parameter for which the evaluation value J is minimum can be calculated within the ranges of the camera parameters illustrated in FIGS. 12A to 14B. In other words, camera calibration is possible according to this method.

Figure 12A:
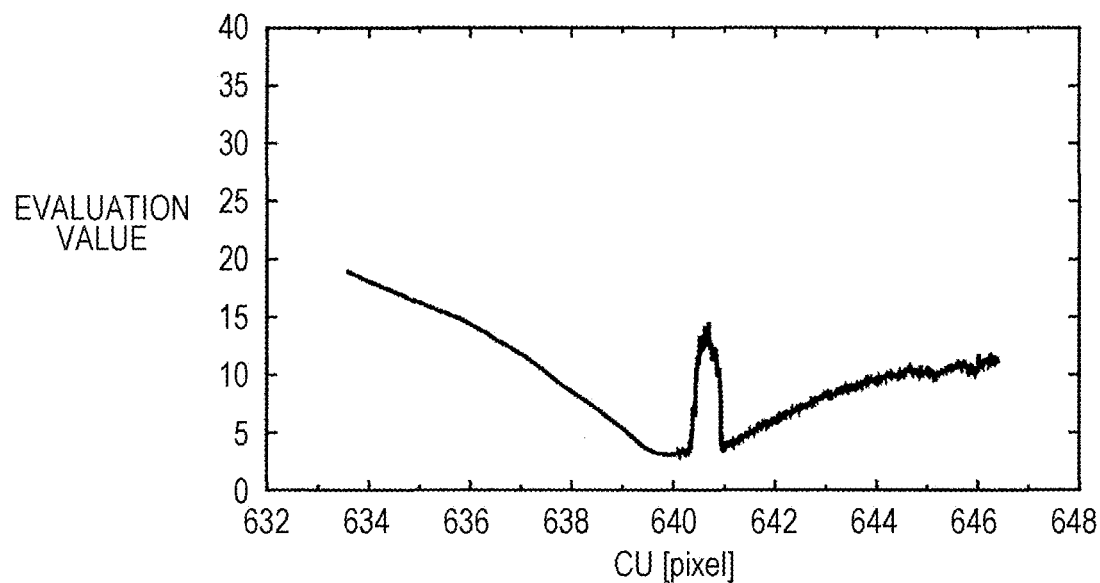
FIG. 12A illustrates an example relationship between a camera parameter and an evaluation value in an experimental example under experimental condition 1 for self-calibration.
Figure 12B:
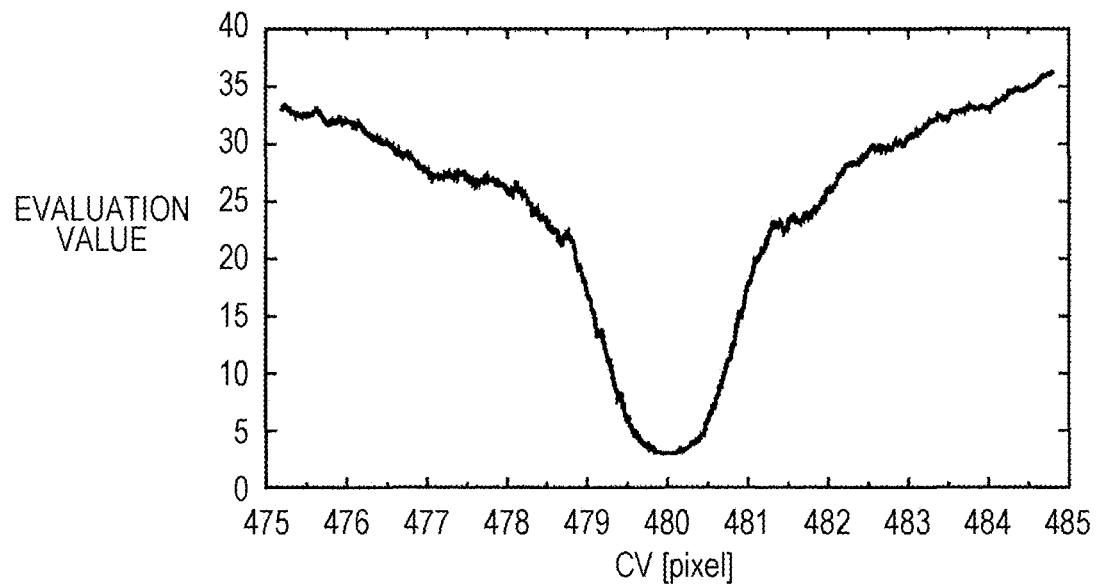
FIG. 12B illustrates an example relationship between a camera parameter and an evaluation value in the experimental example under experimental condition 1 for self-calibration.
Figure 12C:
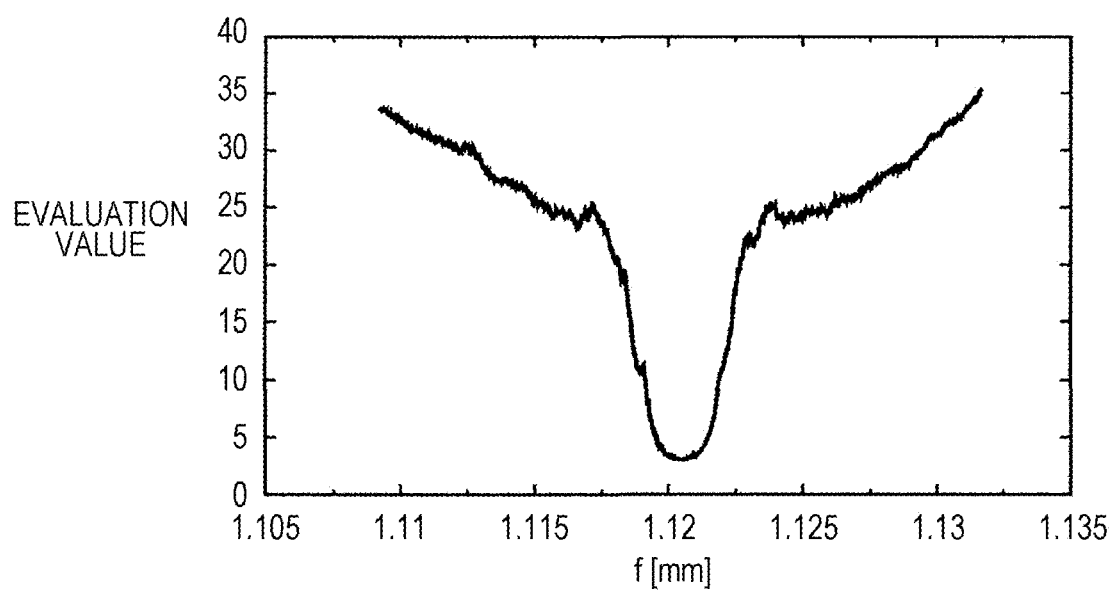
FIG. 12C illustrates an example relationship between a camera parameter and an evaluation value in the experimental example under experimental condition 1 for self-calibration.
Figure 12D:
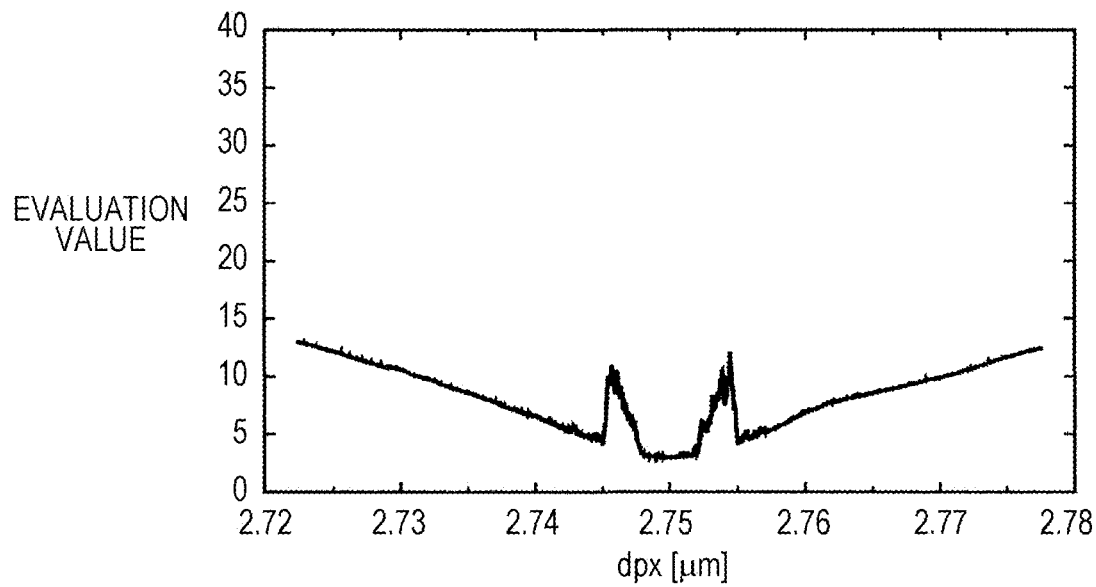
FIG. 12D illustrates an example relationship between a camera parameter and an evaluation value in the experimental example under experimental condition 1 for self-calibration.
Figure 13A:
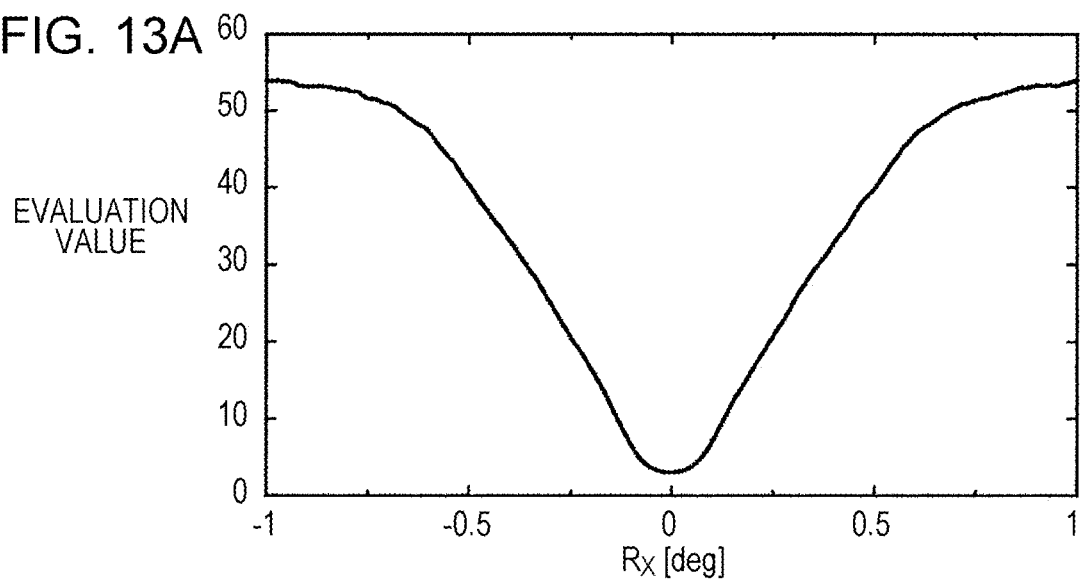
FIG. 13A illustrates an example relationship between a camera parameter and an evaluation value in the experimental example under experimental condition 1 for self-calibration.
Figure 13B:
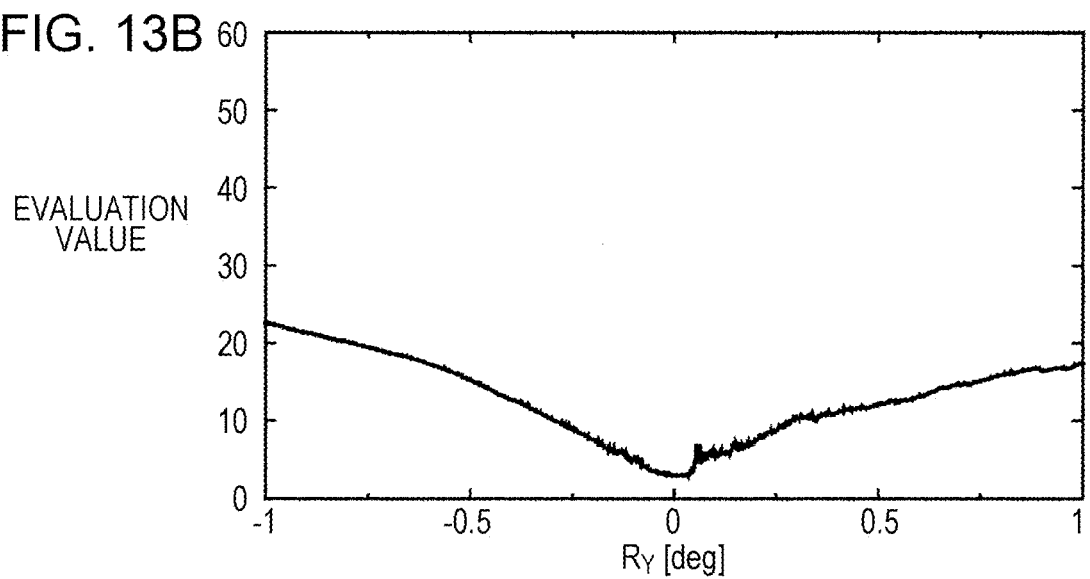
FIG. 13B illustrates an example relationship between a camera parameter and an evaluation value in the experimental example under experimental condition 1 for self-calibration.
Figure 13C:
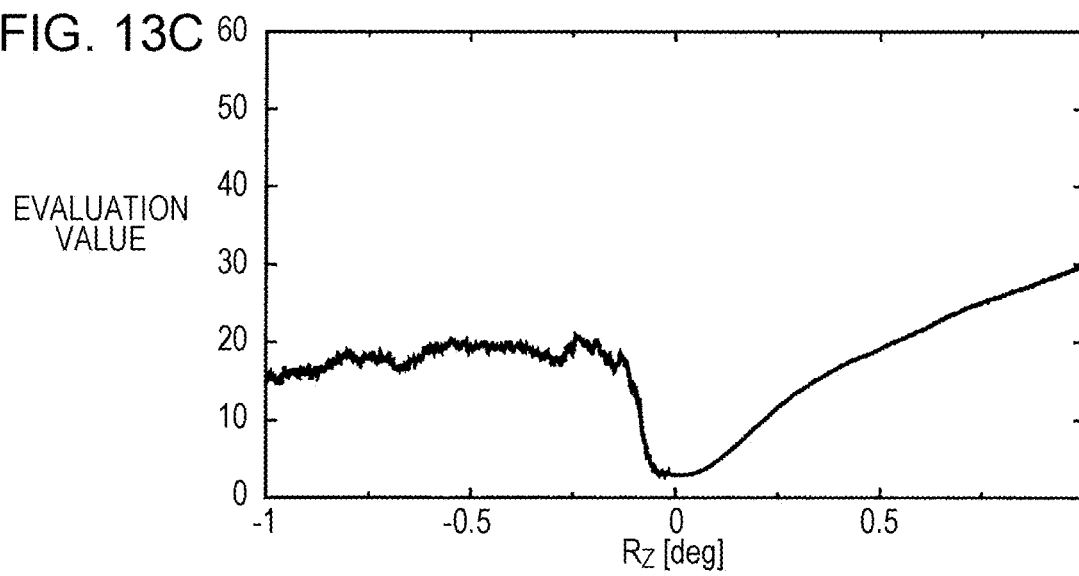
FIG. 13C illustrates an example relationship between a camera parameter and an evaluation value in the experimental example under experimental condition 1 for self-calibration.
Figure 14A:
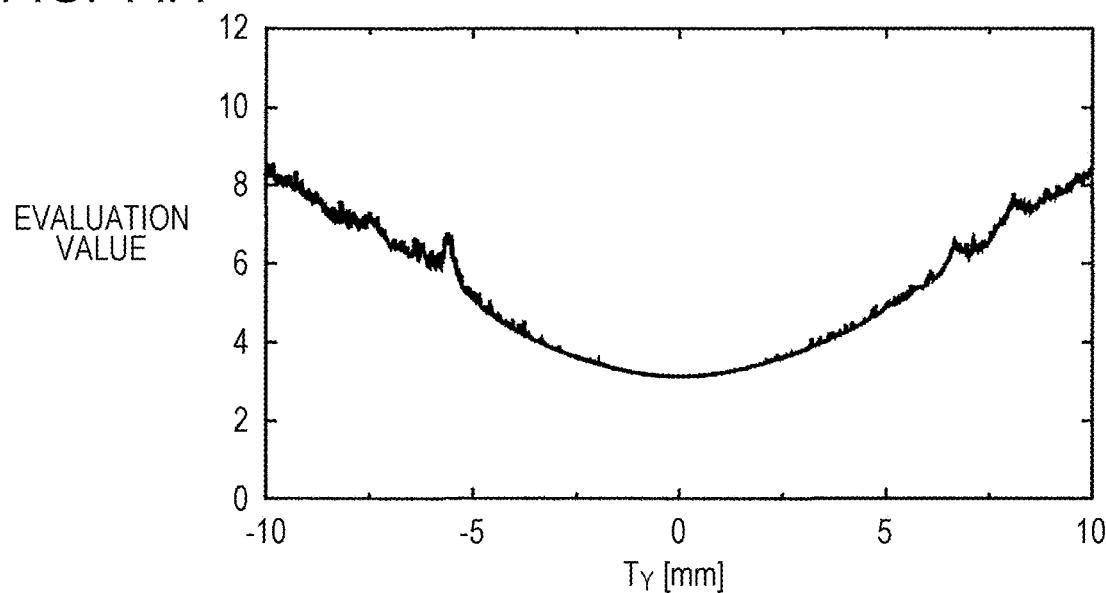
FIG. 14A illustrates an example relationship between a camera parameter and an evaluation value in the experimental example under experimental condition 1 for self-calibration.
Figure 14B:
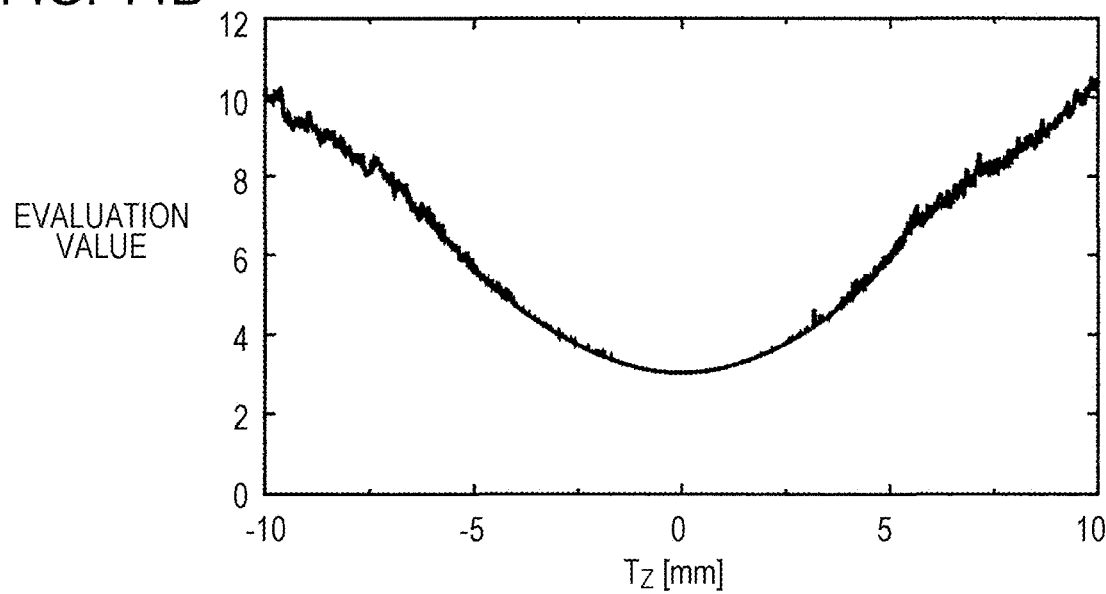
FIG. 14B illustrates an example relationship between a camera parameter and an evaluation value in the experimental example under experimental condition 1 for self-calibration.

For example, referring to FIG. 12A, evaluation values are calculated with increasing and decreasing cu at regular or random intervals within the range of 634 to 646 pixels. The value of the camera parameter cu at which the minimum evaluation value among the calculated evaluation values is obtained or a value of the parameter cu at which a sufficiently small evaluation value is obtained is determined as an optimum value. The camera parameter cu determined in the way described above is a camera parameter having the correct value or having a small error from the correct value.

Therefore, as given in an experimental example under experimental condition 1, the evaluation function in equation (10) satisfies the two conditions (i) and (ii) described above in the vicinity of the correct value.

Experimental Condition 2

In experimental condition 2, an experiment was carried out such that the self-calibration process S111 was performed by using the camera parameter set calculation apparatus 111 according to the embodiment of the present disclosure to calculate camera parameters so that the camera parameters have small errors, and the calculation results were verified.

In this experiment, the camera images illustrated in FIG. 11 were input to the camera parameter set calculation apparatus 111 and a pre-known correct value was used for a set of corresponding points between the camera images, as in experimental condition 1. In addition, all of the camera parameters of the cameras 101a and 101b were set to the correct values, namely, design values. Thereafter, random noise within a predetermined range was added for the nine camera parameters of the camera 101b, and the resulting camera parameters were used as initial camera parameters. Evaluation values were calculated while one of the nine parameters of the camera 101b is changed within the predetermined range, and the value of the camera parameter at which the minimum evaluation value among the calculated evaluation values was obtained was determined as an optimum value. This process was repeatedly performed sequentially for the nine camera parameters during a single trial, and such a trial was repeated multiple times.

Experimental Results 2

Figure 15A:
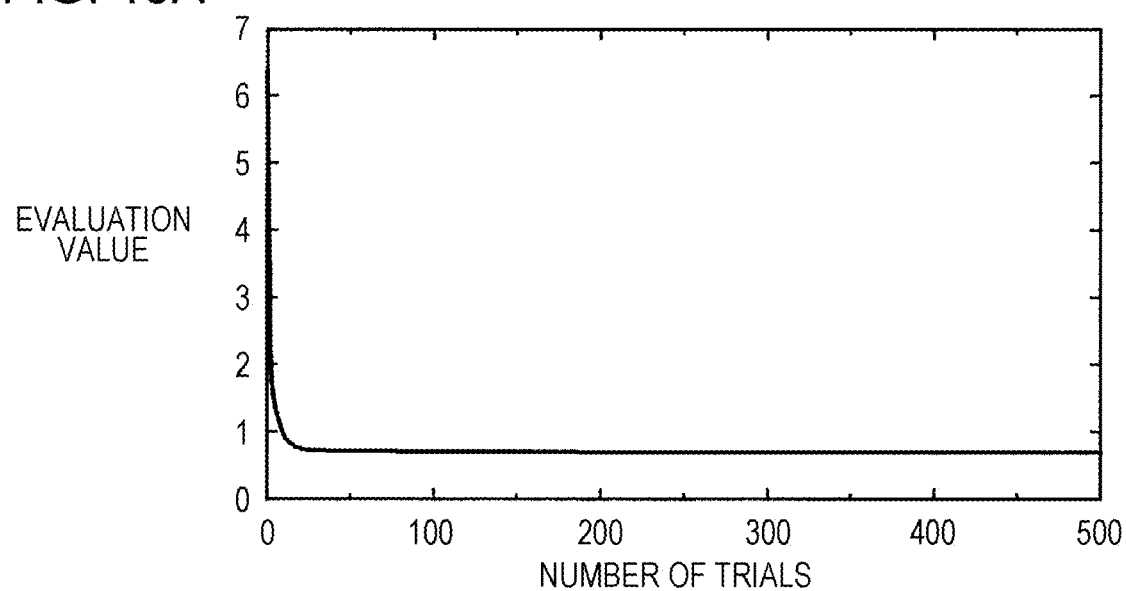
FIG. 15A illustrates an example relationship between the number of trials and an evaluation value in an experimental example under experimental condition 2 for self-calibration.
Figure 15B:
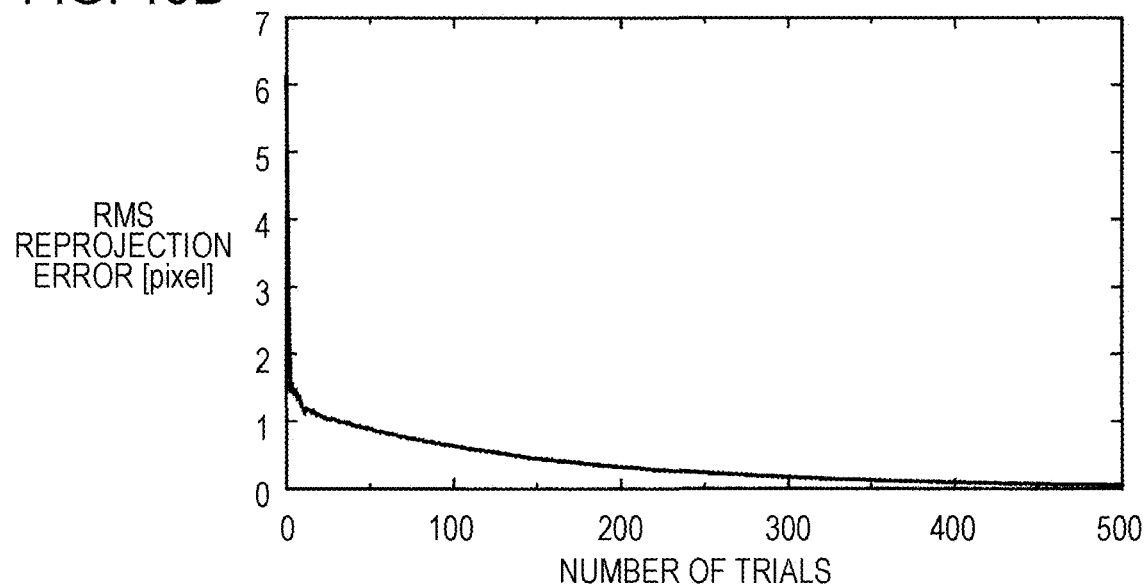
FIG. 15B illustrates an example relationship between the number of trials and reprojection errors in the experimental example under experimental condition 2 for self-calibration.

Experimental results 2 obtained under experimental condition 2, described above, will be described. Specifically, examples of experimental results 2 as illustrated in FIG. 15A and FIG. 15B were obtained. In FIG. 15A, the horizontal axis represents the number of trials, and the vertical axis represents the evaluation value J given by equation (10). That is, in FIG. 15A, evaluation values calculated by using camera parameters obtained as a result of performing the trial a number of times indicated by the horizontal axis are indicated by the values plotted on the vertical axis. In FIG. 15B, the horizontal axis represents the number of trials, and the vertical axis represents the root mean square (RMS) value of the reprojection error. The reprojection error is a measure of how the calculated camera parameter satisfies equations (1) and (3). Specifically, when the correct values for a set including a three-dimensional coordinate set on the subject appearing in the camera image $I_b$ obtained by the camera 101b and the corresponding pixel coordinate pair are known, a pixel coordinate pair obtained by projecting the correct three-dimensional coordinate set on the camera image $I_b$ is calculated by using the calculated camera parameter of the camera 101b. The difference between the calculated pixel coordinate pair and the correct pixel coordinate pair is referred to as a reprojection error. That is, a smaller reprojection error indicates a camera parameter with a smaller error from the correct value such that the reprojection error satisfies equations (1) and (3). In FIG. 15A and FIG. 15B, the evaluation value decreases as the number of trials increases. Therefore, the difference between two pixel values at projected points on the two camera images decreases. Additionally, the reprojection error also decreases as the number of trials increase.

It is therefore concluded that the camera parameter set calculation apparatus 111 according to the embodiment of the present disclosure performs the self-calibration process S111, thereby calculating camera parameters with a small reprojection error, that is, camera parameters well satisfying equations (1) and (3) and having small errors from the correct values.

As described above, the camera parameters that minimize the evaluation value J given by equation (10) above, which are obtained through the self-calibration process S111, can be camera parameters having correct values or having small errors at least when the evaluation function for the evaluation value J satisfies the two conditions (i) and (ii) described above. That is, there are advantages in that the camera parameter set calculation apparatus 111 performs the processing of steps S1001 to S1007, thereby calculating accurate camera parameters of the cameras 101a and 101b by using two camera images obtained by the cameras 101a and 101b and the initial camera parameter sets of the cameras 101a and 101b and performing updating.

In the calibration techniques of the related art, reference points having three-dimensional coordinate sets and pixel coordinate pairs between which correspondences are known are used. Thus, such calibration techniques of the related art require equipment or the like including a calibration marker. In the camera parameter set calculation apparatus 111 according to this embodiment, in contrast, a set of corresponding points is extracted by using camera images obtained by two cameras, and a three-dimensional coordinate set of a point (distance measurement point) on a subject corresponding to the extracted set of corresponding points is calculated. In addition, projected points of the corresponding points included in the set of corresponding points on the respective camera images obtained by the two cameras are calculated by using the three-dimensional coordinate set. When the camera parameters are correct, the pixel values of the projected points on the two camera images are equal, whereas as the error in camera parameter increases, the difference between the pixel values of the projected points on the two camera images increases. In the camera parameter set calculation apparatus 111, accordingly, camera parameters that minimize the difference between the pixel values of the projected points on the two camera images are calculated to calculate the optimum camera parameters, or the correct camera parameters. Thus, there are advantages in that the camera parameter set calculation apparatus 111 can perform camera calibration without using reference points having three-dimensional coordinate sets and pixel coordinate pairs between which correspondences are known, that is, without using equipment or the like including a calibration marker.

4-1. First Modification of Self-Calibration Operation

In the self-calibration process of the camera parameter set calculation apparatus 111 according to the embodiment, a camera with large error in camera parameter, that is, a camera to be calibrated, is identified by the user, and the operation of calibrating the identified camera is started in response to input by the user. The camera to be calibrated may be determined by using any method other than by specifying it by the user.

For example, when three or more cameras are present, all of the cameras may be calibrated. When all of three or more cameras are to be calibrated, for example, the following two calibration approaches are available. In the first calibration approach, the camera parameter set calculation apparatus 111 may extract sets of any two cameras from among sets of multiple cameras and calculate camera parameter sets of two cameras included in one of the sets of two cameras in accordance with a self-calibration process similar to that in the embodiment. That is, the camera parameter set calculation apparatus 111 may calibrate two cameras included in one of the sets of two cameras. Then, the camera parameter set calculation apparatus 111 may sequentially calibrate the sets of two cameras in accordance with a self-calibration process similar to that in the embodiment. Thus, there are advantages in that an on-board camera system can perform calibration without requiring the user to identify a camera to be calibrated. For example, when four cameras are present, six sets of cameras are configured. The camera parameter set calculation apparatus 111 may sequentially calibrate the six sets of cameras. Thus, the camera parameter sets of the cameras included in each set are calibrated with reduced influence of the other sets of cameras. Then, it can be determined whether a result obtained from camera images obtained by the two cameras is correct. For example, it is possible to examine how the camera parameter sets are modified, or updated, on the basis of the determination result. It is also possible to perform calibration for partial regions in the fields of view of the cameras.

In the second calibration approach, the obtaining unit 901 of the camera parameter set calculation apparatus 111 may obtain camera images captured by three or more cameras, and the three-dimensional point group calculation unit 902 may calculate three-dimensional coordinate sets of overlapping imaging regions on the three or more cameras image. Further, the evaluation value calculation unit 903 may calculate an evaluation value based on differences between pixel values of projected points obtained by projecting the calculated three-dimensional coordinate sets on the respective camera images, and the camera parameter determination unit 904 may determine a camera parameter that minimizes the evaluation value. The pixel value calculated for each of the overlapping imaging regions is applied to the calculation of an evaluation value, thus enabling a single camera to be calibrated by using multiple overlapping imaging regions. This enables an increase in the area of an image that can be used for calibration and enables entire calibration of a camera over a wide region in the field of view thereof. Alternatively, pixel values calculated within all the overlapping imaging regions may be applied to the calculation of an evaluation value, thus enabling overall calibration of multiple cameras.

Figure 16:
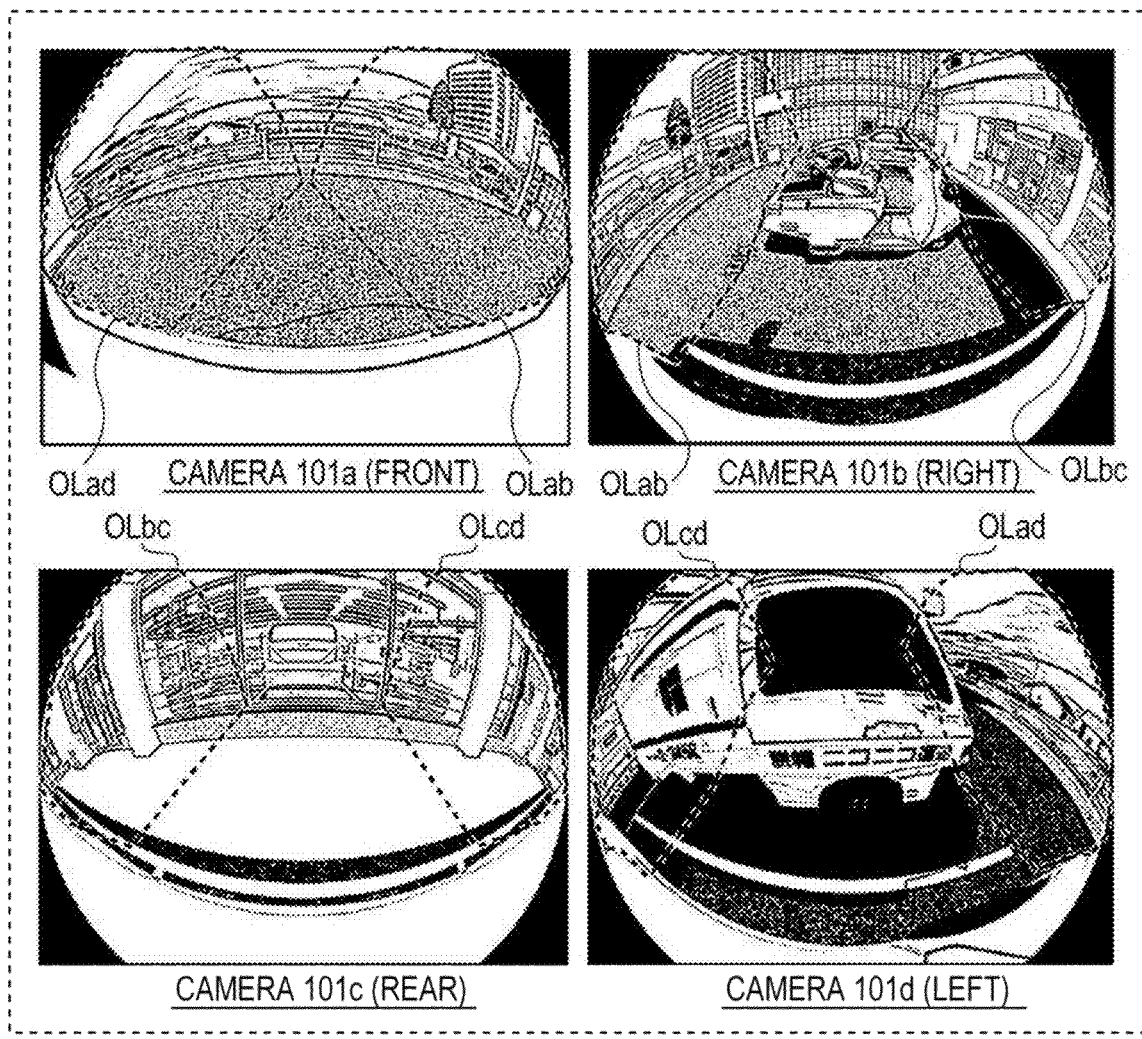
FIG. 16 illustrates an example of images captured by four cameras, each image including overlapping imaging regions.

For example, FIG. 16 illustrates an example of camera images captured by the four cameras 101a to 101d arranged in the manner illustrated in FIG. 3. Each of the camera images includes multiple overlapping imaging regions. FIG. 16 illustrates an example of images captured by the four cameras 101a to 101d, each image including overlapping imaging regions. Each camera image includes overlapping imaging regions, each of which is a region of a subject imaged by two adjacent cameras. Specifically, a camera image captured by the camera 101a, which is mounted on the front of the vehicle, includes an overlapping imaging region OLab of the camera 101a and the camera 101b, which is mounted on the right side of the vehicle, and an overlapping imaging region OLad of the camera 101a and the camera 101d, which is mounted on the left side of the vehicle. A camera image captured by the camera 101b includes the overlapping imaging region OLab of the camera 101b and the camera 101a, and an overlapping imaging region OLbc of the camera 101b and the camera 101c, which is mounted on the rear of the vehicle. A camera image captured by the camera 101c includes the overlapping imaging region OLbc of the camera 101c and the camera 101b, and an overlapping imaging region OLcd of the camera 101c and the camera 101d. A camera image captured by the camera 101d includes the overlapping imaging region OLcd of the camera 101d and the camera 101c, and the overlapping imaging region OLad of the camera 101d and the camera 101a.

In the first calibration approach, for example, the evaluation value calculation unit 903 calculates an evaluation value for each set of two cameras in view of their overlapping imaging regions by using equation (10) above, and the camera parameter determination unit 904 determines, for each set of cameras, camera parameters that minimize the evaluation value.

In the second calibration approach, for example, the evaluation value calculation unit 903 calculates an evaluation value for an entire overlapping imaging region in view of overlapping imaging regions on camera images captured by all sets of cameras by using equation (13) below instead of using equation (10) above. Then, the camera parameter determination unit 904 determines camera parameters that minimize the evaluation value. In equation (13), the evaluation value J is given by the sum of the first, second, third, and fourth terms. The first term of equation (13) is obtained by applying equation (10) above to N distance measurement points in the overlapping imaging region OLab between the camera images captured by the camera 101a and the camera 101b. The second term of equation (13) is obtained by applying equation (10) above to P distance measurement points in the overlapping imaging region OLad between the camera images captured by the camera 101a and the camera 101d. The third term of equation (13) is obtained by applying equation (10) above to Q distance measurement points in the overlapping imaging region OLbc between the camera images captured by the camera 101b and the camera 101c. The fourth term of equation (13) is obtained by applying equation (10) above to S distance measurement points in the overlapping imaging region OLcd between the camera images captured by the camera 101c and the camera 101d. Further, the operation of steps S1003 to S1007 in FIG. 10 using equation (13) can be given by equation (14) below. In equation (14), $C_{ar}$, $C_{br}$, $C_{cr}$, and $C_{dr}$ denote camera parameter sets of the camera 101a, 101b, 101c, and 101d, respectively.

$$J = \frac{1}{N}\sum_{n=1}^{N}|I_a(u_{am}, v_{am}) - I_b(u_{bm}, v_{bm})| + \quad (13)$$

$$\frac{1}{P}\sum_{p=1}^{P}|I_a(u_{arp}, v_{arp}) - I_d(u_{drp}, v_{drp})| +$$

$$\frac{1}{Q}\sum_{q=1}^{Q}|I_b(u_{brq}, v_{brq}) - I_c(u_{crq}, v_{crq})| +$$

$$\frac{1}{S}\sum_{s=1}^{S}|I_c(u_{crs}, v_{crs}) - I_d(u_{drs}, v_{drs})|$$

$$\operatorname*{argmin}_{C_{ar}, C_{br}, C_{cr}, C_{dr}}(J) = \operatorname*{argmin}_{C_{ar}, C_{br}, C_{cr}, C_{dr}} \left\{ \frac{1}{N}\sum_{n=1}^{N}|I_a(u_{am}, v_{am}) - I_b(u_{bm}, v_{bm})| + \right. \quad (14)$$

$$\frac{1}{P}\sum_{p=1}^{P}|I_a(u_{arp}, v_{arp}) - I_d(u_{drp}, v_{drp})| +$$

$$\frac{1}{Q}\sum_{q=1}^{Q}|I_b(u_{brq}, v_{brq}) - I_c(u_{crq}, v_{crq})| +$$

$$\left. \frac{1}{S}\sum_{s=1}^{S}|I_c(u_{crs}, v_{crs}) - I_d(u_{drs}, v_{drs})| \right\}$$

In the self-calibration process according to the embodiment, the camera parameter set calculation apparatus 111 uses, for example, portions of camera images, which are leaned to either side, as illustrated in FIG. 11, as overlapping imaging regions to be used for the calibration of the cameras 101a and 101b. However, to calibrate all the cameras, overlapping imaging regions of all of the cameras are used for calibration, which enables calibration using larger regions in camera images. Thus, there are advantages in that calibration accuracy can be increased. In addition, cameras are arranged in such a manner that three or more images do not overlap each other in each overlapping imaging region, which may increase the area of the overlapping imaging region. This enables a further increase in calibration accuracy.

4-2. Second Modification of Self-Calibration Operation

The camera parameter set calculation apparatus 111 according to the embodiment start of the self-calibration process S111, which is triggered by a user input. However, this is not restrictive. The camera parameter set calculation apparatus 111 may automatically start the self-calibration process S111 by using any other trigger. For example, the camera parameter set calculation apparatus 111 may automatically start self-calibration, which is triggered by input from a sensor such as a temperature sensor, an impact sensor, or a timer.

Figure 17:
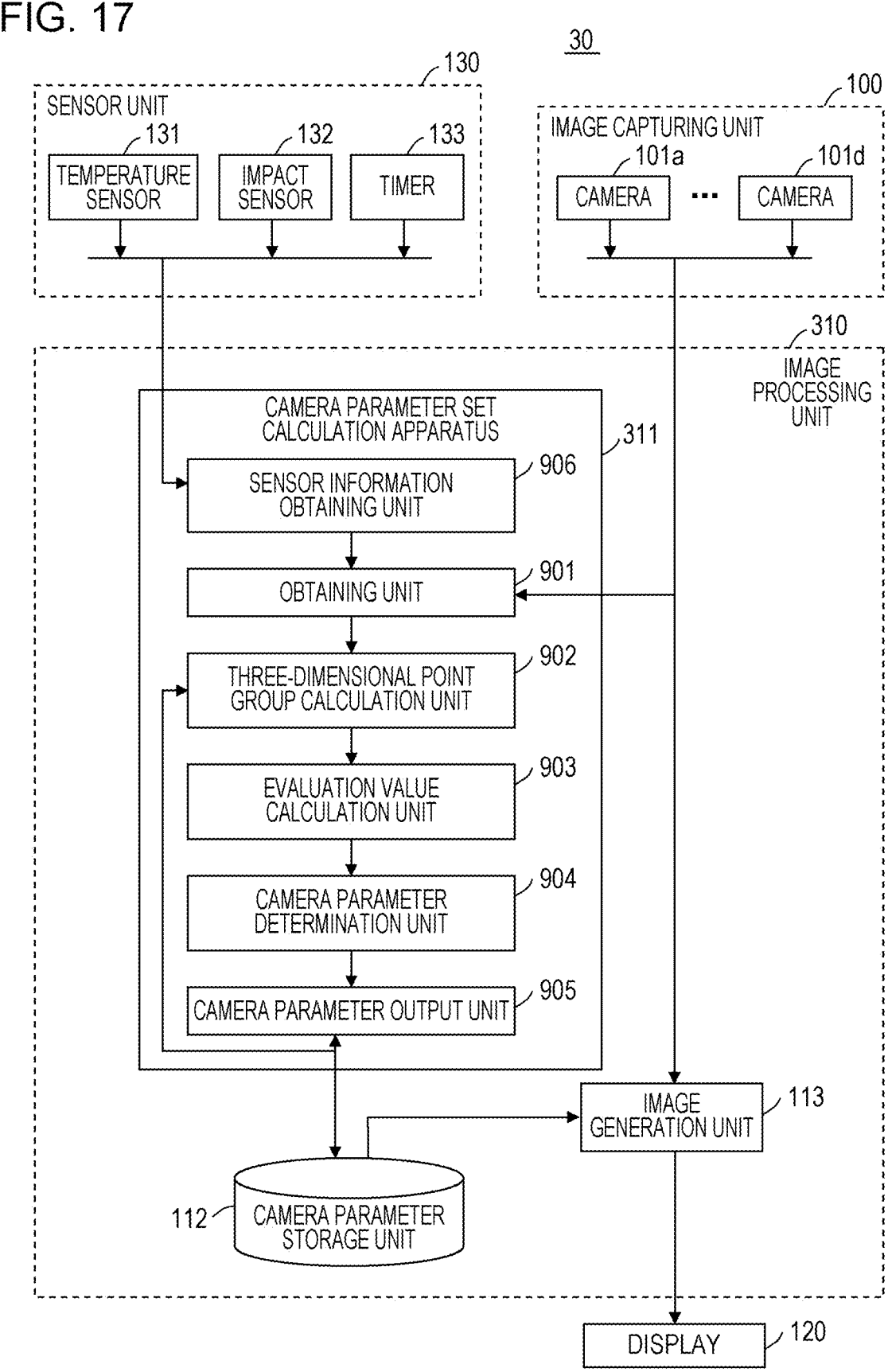
FIG. 17 is a block diagram illustrating the configuration of an on-board camera system according to a second modification.

For example, FIG. 17 is a block diagram illustrating the configuration of an on-board camera system 30 including a sensor unit 130 according to the second modification. The on-board camera system 30 includes the sensor unit 130 in addition to the configuration of the on-board camera system 10 according to the embodiment. The sensor unit 130 includes a temperature sensor 131, an impact sensor 132, and a timer 133. The on-board camera system 30 includes an image processing unit 310 including a camera parameter set calculation apparatus 311. The camera parameter set calculation apparatus 311 includes a sensor information obtaining unit 906 in addition to the configuration of the camera parameter set calculation apparatus 111 according to the embodiment. The sensor information obtaining unit 906 obtains detection information from the sensor unit 130 and outputs an instruction to start the self-calibration process.

The camera parameter set calculation apparatus 311 according to this modification may perform a self-calibration process once immediately after the power to the on-board camera system 30 is turned on. Instead of or in addition to performing a self-calibration process once immediately after the power is turned on, the camera parameter set calculation apparatus 311 may perform a self-calibration process in response to input from the timer 133 in the sensor unit 130, in response to input from the impact sensor 132 in the sensor unit 130, or in response to input from the temperature sensor 131 in the sensor unit 130. The self-calibration process may be performed in response to input from the timer 133 at intervals of certain times detected by the timer 133. The self-calibration process may be performed in response to input from the impact sensor 132 when the impact sensor 132 detects a strong impact on an automobile including the on-board camera system 30 during an accident or the like. The impact sensor 132 may be an acceleration sensor. The self-calibration process may be performed in response to input from the temperature sensor 131 when the temperature sensor 131 detects that the ambient temperature of the on-board camera system 30 reaches a predetermined temperature.

4-3. Third Modification of Self-Calibration Operation

During the self-calibration process S111, in step S1003, the camera parameter set calculation apparatus 111 according to the embodiment extracts N sets of corresponding points between the camera images $I_a$ and $I_b$ and calculates three-dimensional coordinate sets of points (distance measurement points) on a subject, each point corresponding to one of the extracted N sets of corresponding points, in accordance with the stereoscopic distance measurement technique. In step S1004, the camera parameter set calculation apparatus 111 calculates an evaluation value J by using the three-dimensional coordinate sets. However, not all of the distance measurement points may be used for the calculation of the evaluation value J.

In this modification, the camera parameter set calculation apparatus 111 removes three-dimensional coordinate sets of distance measurement points associated with no or negligibly small brightness gradient of an image among the three-dimensional coordinate sets of the N distance measurement points calculated by using stereoscopic distance measurement. This enables a reduction in the number of distance measurement points used for the calculation of the evaluation value J and a reduction in the amount of computation required for the camera parameter set calculation apparatus 111 to calculate the evaluation value J.

The self-calibration process of the camera parameter set calculation apparatus 111 according to this modification is similar to that according to the embodiment, except for the operation of step S1004. Thus, the operation of step S1004 according to this modification will be described and the description of the other operations will be omitted.

In step S1004, the evaluation value calculation unit 903 of the camera parameter set calculation apparatus 111 calculates a pixel coordinate pair of a first projected point, which is obtained by projecting a distance measurement point on the camera image $I_a$ captured by the camera 101a, and a pixel coordinate pair of a second projected point, which is obtained by projecting the same distance measurement point on the camera image $I_b$ captured by the camera 101b, in accordance with equations (8) and (9) above by using the three-dimensional coordinate set of the distance measurement point and the camera parameter sets $C_{ar}$ and $C_{br}$ of the cameras 101a and 101b.

When Ka distance measurement points are present, the evaluation value calculation unit 903 removes a distance measurement point associated with a pixel value with zero or negligibly small brightness gradient at a pixel coordinate pair $(u_{ar}, v_{ar})$ of a first projected point, which is obtained by projecting the distance measurement point on the camera image $I_a$, among the Ka distance measurement points. If Kb (Kb> or =0) distance measurement points are to be removed, the evaluation value calculation unit 903 selects three-dimensional coordinate sets of (Ka−Kb) distance measurement points.

If pixel values around a pixel coordinate pair $(u_{ar}, v_{ar})$ corresponding to a three-dimensional coordinate set $(x_{ar}, y_{ar}, z_{ar})$ of a given distance measurement point have zero brightness gradient, a slight change in the pixel coordinate pair $(u_{ar}, v_{ar})$ corresponding to the given distance measurement point in accordance with a slight change in camera parameter does not cause a change in the pixel value $I_a(u_{ar}, v_{ar})$ at the pixel coordinate pair $(u_{ar}, v_{ar})$. In other words, the evaluation value J does not change. The removal of such a distance measurement point has no effect on the evaluation value J. In addition, the number of distance measurement points is reduced, thereby achieving an advantage in that the amount of computation performed in step S1004 can be reduced.

Note that another technique may be used to reduce the number of distance measurement points to be used for the calculation of the evaluation value J in step S1004. For example, a distance measurement point that does not appear in a camera image captured by one of the two cameras 101a and 101b may be removed from among the distance measurement points. In this case, pixel coordinate pairs of projected points on the camera images $I_a$ and $I_b$ corresponding to a three-dimensional coordinate set of a distance measurement point may be calculated, and, when one of the two pixel coordinate pairs is located within an invisible region on the corresponding camera image, the distance measurement point may be removed from among the distance measurement points to be used for the calculation of the evaluation value J.

Equation (10) above indicates that when the same distance measurement point appear in the two camera images $I_a$ and $I_b$, the difference between the pixel values of the projected points of the distance measurement point on the camera images $I_a$ and $I_b$ is 0. If one of the projected points of the distance measurement point on the camera images $I_a$ and $I_b$ is located outside the imaging range of the cameras 101a and 101b or if one of the projected points of the distance measurement point on the camera images $I_a$ and $I_b$ is located within the imaging range but is occluded by some other objects and thus does not appear in the corresponding one of the camera images $I_a$ and $I_b$, that is, if one of the projected points of the distance measurement point on the camera images $I_a$ and $I_b$ is located within an occlusion region, the difference between the pixel values is not 0 but constitutes an error in evaluation value. Thus, a distance measurement point of which at least one of the projected points does not appear in the camera image(s), or is located within an invisible region on the camera image(s), is removed from among the distance measurement points to be used for the calculation of an evaluation value. Thus, advantages can be expected such that the error in evaluation value can be reduced. The determination of whether projected points of a distance measurement point are located within an invisible region on camera images may be based on the occlusion information described above, which specifies the range of a three-dimensional space outside an imaging range of a camera.

In step S1005 in the self-calibration process S111 of the camera parameter set calculation apparatus 111, iterative computation is terminated in accordance with termination conditions such as a condition in which the evaluation value J is less than a first threshold and a condition in which the number of iterations r of the processing is greater than a second threshold. However, the condition for terminating the iterative computation is not limited to this. For example, any other termination condition may be additionally used. For example, a condition in which the evaluation value J does not change when a camera parameter set changes may be used as a termination condition.

In the self-calibration process S111 of the camera parameter set calculation apparatus 111, when the evaluation function for the evaluation value J satisfies the two conditions described above, a camera parameter with a small evaluation value J, that is, a camera parameter having a small difference, or a small error, from the correct value, can be calculated to perform updating. If the evaluation function does not satisfy the two conditions described above, however, a camera parameter with a small error is not always calculated. For example, when the area to be imaged by a camera is extremely dark and all the pixel values within the area are 0, or when a subject has uniform color with no texture, the evaluation value J given by equation (10) above does not change if the camera parameter is changed, that is, the evaluation value J has a constant value (e.g., 0). If the camera parameter set calculation apparatus 111 obtains such a camera image, in the self-calibration process S111, the iterative process is not completed until the number of iterations r of the processing of steps S1003 to S1006 is greater than or equal to the second threshold, and the evaluation value remains unchanged and is not updated. In this case, the process imposes a computation load on the camera parameter set calculation apparatus 111 even though no camera parameter is updated. In contrast, the iterative process ends when the evaluation value does not change if a camera parameter is changed, thereby achieving an advantage that the computation load can be reduced.

5. Evaluation Function Variations

In the self-calibration process according to the embodiment and the modifications, as given in equation (10) above, an evaluation function based on the sum of the absolute values of respective differences between pixel values corresponding to multiple distance measurement points is applied to an evaluation value J to be used for the self-calibration process of the camera parameter set calculation apparatus 111. However, the evaluation function is not limited to that described above, and any other function based on a difference between pixel values on two camera images corresponding to a distance measurement point may be used. For example, an evaluation function that uses the total sum of squares of the respective differences between two pixel values on two camera images corresponding to distance measurement points may be used. Specifically, for each distance measurement point, the square of a difference between a pixel value at a first projected point, which is obtained by projecting the distance measurement point on the camera image $I_a$, and a pixel value at a second projected point, which is obtained by projecting the same distance measurement point on the camera image $I_b$, is determined and the resulting values for respective distance measurement points are added together to determine an evaluation function. An example of such an evaluation function is given by equation (15) as follows.

$$J = \frac{1}{N} \sum_{k=1}^{N} \{I_a(u_{am}, v_{am}) - I_b(u_{bm}, v_{bm})\}^2 \tag{15}$$

A camera parameter calculated based on an evaluation value defined by, as given in equation (10) above, the sum of the absolute values of differences between pixel values is close to the true value, that is, has a small error from the true value, if the differences between the pixel values have a Laplace distribution. Such advantages can be expected.

In contrast, a camera parameter calculated based on an evaluation value defined by, as given in equation (15) above, the sum of the squares of differences between pixel values is close to the true value, that is, has a small error from the true value, if errors of the pixel values have a Gaussian distribution. Such advantages can be expected.

Others

While a camera parameter set calculation apparatus and the like according to one or more aspects of the present disclosure have been described with reference to an embodiment and so on, the present disclosure is not limited to the embodiment and the like. Various modifications conceivable to a person skilled in the art may be made to this embodiment and the like without departing from the gist of the present disclosure, and the constituent elements in different embodiments may be combined into other embodiments. Such modifications and embodiments may also be included in the scope of one or more aspects of the present disclosure.

In the embodiment and the modifications, the image capturing unit 100 includes the four cameras 101a to 101d. However, the number of cameras is not limited to four. It is desirable that the image capturing unit 100 include at least two cameras to achieve self-calibration according to embodiments of the present disclosure, and any number (more than one) of cameras may be used. In addition, cameras may be combined into a single unit or may be disposed separately.

In the embodiment and the modifications, as a non-limiting example, an image capturing unit, an image processing unit, and a display in an on-board camera system are mounted in an automobile, and a camera parameter set calculation apparatus included in the image processing unit is also mounted in the automobile. For example, the image capturing unit, the image processing unit, and the display may be mounted in any mobile body other than an automobile. Examples of the mobile body may include a vehicle other than an automobile, a ship, an aerial vehicle, and a robot. Examples of the vehicle other than an automobile may include a truck, a bus, a two-wheeled vehicle, a vehicle for conveyance, a railroad, a construction machine, and cargo-handling equipment. Examples of the aerial vehicle may include an aircraft and a drone. The robot may be remotely controlled by a user.

The camera parameter set calculation apparatus may be configured as a computer placed in a different location connected to the automobile via a network. Due to the large computation load, a self-calibration process for camera parameters, which is performed by the camera parameter set calculation apparatus, is implemented by a computer having high computation capacities, such as a server, rather than by a computer mounted in an automobile with limited computation capacities, thereby achieving an advantage that parameters can be calculated with higher accuracy within a shorter time period for computation.

As described above, the technique disclosed herein may be implemented by a system, an apparatus, a method, an integrated circuit, a computer program, or a computer-readable recording medium such as a recording disc, or may be implemented by any combination of the system, the apparatus, the method, the integrated circuit, the computer program, and the recording medium. Examples of the computer-readable recording medium include a non-volatile recording medium such as a CD-ROM.

For example, the constituent elements included in the on-board camera system 10 according to the embodiment described above are typically implemented as an integrated circuit, namely, large scale integration (LSI). These constituent elements may be formed as individual chips or some or all of the constituent elements may be integrated into a single chip.

A technique for forming an integrated circuit is not limited to LSI and may be implemented by using a dedicated circuit or a general-purpose processor. A field programmable gate array (FPGA), which is programmable after LSI manufacturing, or a reconfigurable processor which allows reconfiguration of connections and settings of circuit cells in an LSI device after LSI manufacturing may be used.

In the embodiment described above, each of the constituent elements may be implemented by dedicated hardware or may be implemented by executing a software program suitable for each constituent element. Each constituent element may be implemented by a program execution unit such as a CPU or a processor reading and executing a software program recorded on a recording medium such as a hard disk or a semiconductor memory.

Some or all of the constituent elements may be constituted by a removable integrated circuit (IC) card or a single module. The IC card or the module is a computer system including a microprocessor, a ROM, a RAM, and so on. The IC card or the module may include the LSI described above or a system LSI. The microprocessor operates in accordance with a computer program, thereby allowing the IC card or the module to achieve its functions. The IC card and the module may be tamper-resistant.

A camera parameter set calculation method according to an embodiment of the present disclosure may be implemented by a circuit such as a micro processing unit (MPU), a CPU, a processor, or an LSI device, an IC card, a stand-alone module, or the like.

The technique disclosed herein may also be implemented by a software program or a digital signal including the software program, or may be implemented by a non-transitory computer-readable recording medium storing the program. It should be understood that the program can be distributed via a transmission medium such as the Internet.

The numerals used in the foregoing description, such as ordinal numbers and quantities, are all illustrative for describing the technique disclosed herein, and the present disclosure is not limited to the numerals given for illustrative purposes. In addition, connections between constituent elements are illustrative for describing the technique disclosed herein, and connections for achieving the functionality disclosed herein are not limited thereto.

Additionally, the division into functional blocks in the block diagrams is illustrative. Multiple functional blocks may be implemented as a single functional block, or a single functional block may be divided into multiple sections. Alternatively, some functions may be transferred from one functional block to another. Furthermore, the functions of multiple functional blocks having similar functions may be executed in parallel or in a time-sharing manner by single hardware or software.

A camera parameter calculation apparatus and the like according to embodiments of the present disclosure are suitable for use in the calculation of camera parameters of at least two cameras.

What is claimed is:

1. A camera parameter set calculation apparatus comprising:
   at least one control circuit, wherein
   the at least one control circuit
   (a1) obtains a first image captured by a first camera and a second image captured by a second camera,
   (a2) obtains a first camera parameter set including one or more camera parameters of the first camera and a second camera parameter set including one or more camera parameters of the second camera,
   (a3) calculates three-dimensional coordinate sets corresponding to overlapping regions each included in the first image and the second image, based on the first image, the second image, the first camera parameter set, and the second camera parameter set, the overlapping region of the first image including an image of a portion of a subject, the overlapping region of the second image including an image of the portion,
   (a4) determines first pixel coordinate pairs based on the first camera parameter set by projecting the three-dimensional coordinate sets on the first image and second pixel coordinate pairs based on the second camera parameter set by projecting the three-dimensional coordinate sets on the second image,
   (a5) calculates an evaluation value, based on pixel values at the first pixel coordinate pairs on the first image and pixel values at the second pixel coordinate pairs on the second image,
   (a6) updates the first camera parameter set and the second camera parameter set, based on the evaluation value, and
   (a7) outputs the updated first camera parameter set and the updated second camera parameter set.

2. The camera parameter set calculation apparatus according to claim 1, wherein
   the first image and the second image comprise one of
   (i) a combination of images including an image obtained by a camera mounted on a front of a vehicle capturing an image of an area in front of the vehicle and an image obtained by a camera mounted on a left side of the vehicle capturing an image of an area on the left side of the vehicle,
   (ii) a combination of images including an image obtained by the camera mounted on the front of the vehicle capturing an image of an area in front of the vehicle and an image obtained by a camera mounted on a right side of the vehicle capturing an image of an area on the right side of the vehicle,
   (iii) a combination of images including an image obtained by a camera mounted on a rear of the vehicle capturing an image of an area behind the vehicle and an image obtained by the camera mounted on the left side of the vehicle capturing an image of an area on the left side of the vehicle, or
   (iv) a combination of images including an image obtained by the camera mounted on the rear of the vehicle capturing an image of an area behind the vehicle and an image obtained by the camera mounted on the right side of the vehicle capturing an image of an area on the right side of the vehicle.

3. The camera parameter set calculation apparatus according to claim 1, wherein
in (a5), the at least one control circuit calculates the evaluation value, based on differences between the pixel values at the first pixel coordinate pairs on the first image and the pixel values at the second pixel coordinate pairs on the second image.

4. The camera parameter set calculation apparatus according to claim 1, wherein the at least one control circuit
further obtains a third image captured by a third camera and a third camera parameter set of the third camera,
determines sets of two images among the first image, the second image, and the third image, and
sequentially performs (a3) to (a5) on the sets of two images.

5. The camera parameter set calculation apparatus according to claim 1, wherein the at least one control circuit
further obtains a third image captured by a third camera and a third camera parameter set of the third camera,
determines sets of two images among the first image, the second image, and the third image, and
performs (a3) to (a5) on the sets of two images to obtain pixel values and calculates the evaluation value by using the obtained pixel values.

6. The camera parameter set calculation apparatus according to claim 4, wherein
the first image and the second image each include a first overlapping region including a portion of the subject,
the second image and the third image each include a second overlapping region including a portion of the subject, and
the first overlapping region and the second overlapping region do not overlap each other.

7. The camera parameter set calculation apparatus according to claim 1, wherein
the first image and the second image are images captured by the first camera and the second camera, respectively, the first camera and the second camera being arranged such that an optical axis of the first camera and an optical axis of the second camera are directed to intersect at centers of the optical axes.

8. A camera parameter set calculation method comprising:
(a1) obtaining a first image captured by a first camera and a second image captured by a second camera;
(a2) obtaining a first camera parameter set including one or more camera parameters of the first camera and a second camera parameter set including one or more camera parameters of the second camera;
(a3) calculating three-dimensional coordinate sets corresponding to overlapping regions each included in the first image and the second image, based on the first image, the second image, the first camera parameter set, and the second camera parameter set, the overlapping region of the first image including an image of a portion of a subject, the overlapping region of the second image including an image of the portion;
(a4) determining first pixel coordinate pairs based on the first camera parameter set by projecting the three-dimensional coordinate sets on the first image and second pixel coordinate pairs based on the second camera parameter set by projecting the three-dimensional coordinate sets on the second image;
(a5) calculating an evaluation value, based on pixel values at the first pixel coordinate pairs on the first image and pixel values at the second pixel coordinate pairs on the second image;
(a6) updating the first camera parameter set and the second camera parameter set, based on the evaluation value; and
(a7) outputting the updated first camera parameter set and the updated second camera parameter set,
wherein at least one of (a1) to (a8) is performed by a processor.

9. The camera parameter set calculation method according to claim 8, wherein
the first image and the second image comprise one of
(i) a combination of images including an image obtained by a camera mounted on a front of a vehicle capturing an image of an area in front of the vehicle and an image obtained by a camera mounted on a left side of the vehicle capturing an image of an area on the left side of the vehicle,
(ii) a combination of images including an image obtained by the camera mounted on the front of the vehicle capturing an image of an area in front of the vehicle and an image obtained by a camera mounted on a right side of the vehicle capturing an image of an area on the right side of the vehicle,
(iii) a combination of images including an image obtained by a camera mounted on a rear of the vehicle capturing an image of an area behind the vehicle and an image obtained by the camera mounted on the left side of the vehicle capturing an image of an area on the left side of the vehicle, or
(iv) a combination of images including an image obtained by the camera mounted on the rear of the vehicle capturing an image of an area behind the vehicle and an image obtained by the camera mounted on the right side of the vehicle capturing an image of an area on the right side of the vehicle.

10. The camera parameter set calculation method according to claim 8, wherein
in (a5), the evaluation value is calculated based on differences between the pixel values at the first pixel coordinate pairs on the first image and the pixel values at the second pixel coordinate pairs on the second image.

11. The camera parameter set calculation method according to claim 8, further comprising:
further obtaining a third image captured by a third camera and a third camera parameter set of the third camera;
determining sets of two images among the first image, the second image, and the third image; and
sequentially performing (a3) to (a5) on the sets of two images.

12. The camera parameter set calculation method according to claim 8, further comprising:
further obtaining a third image captured by a third camera and a third camera parameter set of the third camera;
determining sets of two images among the first image, the second image, and the third image; and
performing (a3) to (a5) on the sets of two images to obtain pixel values and calculating the evaluation value by using the obtained pixel values.

13. The camera parameter set calculation method according to claim 11, wherein
the first image and the second image each include a first overlapping region including a portion of the subject, the second image and the third image each include a second overlapping region including a portion of the subject, and the first overlapping region and the second overlapping region do not overlap each other.

14. The camera parameter set calculation method according to claim 8, wherein the first image and the second image are images captured by the first camera and the second camera, respectively, the first camera and the second camera being arranged such that an optical axis of the first camera and an optical axis of the second camera are directed to intersect at centers of the optical axes.

15. A recording medium storing a program for causing a device including a processor to execute a process, the recording medium being a computer-readable non-volatile recording medium, the process comprising:

(a1) obtaining a first image captured by a first camera and a second image captured by a second camera;

(a2) obtaining a first camera parameter set including one or more camera parameters of the first camera and a second camera parameter set including one or more camera parameters of the second camera;

(a3) calculating three-dimensional coordinate sets corresponding to overlapping regions each included in the first image and the second image, based on the first image, the second image, the first camera parameter set, and the second camera parameter set, the overlapping region of the first image including an image of a portion of a subject, the overlapping region of the second image including an image of the portion;

(a4) determining first pixel coordinate pairs based on the first camera parameter set by projecting the three-dimensional coordinate sets on the first image and second pixel coordinate pairs based on the second camera parameter set by projecting the three-dimensional coordinate sets on the second image;

(a5) calculating an evaluation value, based on pixel values at the first pixel coordinate pairs on the first image and pixel values at the second pixel coordinate pairs on the second image;

(a6) updating the first camera parameter set and the second camera parameter set, based on the evaluation value; and (a7) outputting the updated first camera parameter set and the updated second camera parameter set.

16. The recording medium according to claim 15, wherein the first image and the second image comprise one of (i) a combination of images including an image obtained by a camera mounted on a front of a vehicle capturing an image of an area in front of the vehicle and an image obtained by a camera mounted on a left side of the vehicle capturing an image of an area on the left side of the vehicle, (ii) a combination of images including an image obtained by the camera mounted on the front of the vehicle capturing an image of an area in front of the vehicle and an image obtained by a camera mounted on a right side of the vehicle capturing an image of an area on the right side of the vehicle, (iii) a combination of images including an image obtained by a camera mounted on a rear of the vehicle capturing an image of an area behind the vehicle and an image obtained by the camera mounted on the left side of the vehicle capturing an image of an area on the left side of the vehicle, or (iv) a combination of images including an image obtained by the camera mounted on the rear of the vehicle capturing an image of an area behind the vehicle and an image obtained by the camera mounted on the right side of the vehicle capturing an image of an area on the right side of the vehicle.

17. The recording medium according to claim 15, wherein in (a5), the evaluation value is calculated based on differences between the pixel values at the first pixel coordinate pairs on the first image and the pixel values at the second pixel coordinate pairs on the second image.

18. The recording medium according to claim 15, wherein the process further comprises:

further obtaining a third image captured by a third camera and a third camera parameter set of the third camera;

determining sets of two images among the first image, the second image, and the third image; and sequentially performing (a3) to (a5) on the sets of two images.

19. The recording medium according to claim 15, wherein the process further comprises:

further obtaining a third image captured by a third camera and a third camera parameter set of the third camera;

determining sets of two images among the first image, the second image, and the third image; and performing (a3) to (a5) on the sets of two images to obtain pixel values and calculating the evaluation value by using the obtained pixel values.

20. The recording medium according to claim 18, wherein the first image and the second image each include a first overlapping region including a portion of the subject, the second image and the third image each include a second overlapping region including a portion of the subject, and the first overlapping region and the second overlapping region do not overlap each other.

21. The recording medium according to claim 15, wherein the first image and the second image are images captured by the first camera and the second camera, respectively, the first camera and the second camera being arranged such that an optical axis of the first camera and an optical axis of the second camera are directed to intersect at centers of the optical axes.

* * * * *